United States Patent [19]
Hayashi et al.

[11] Patent Number: 6,042,937
[45] Date of Patent: Mar. 28, 2000

[54] TITANIUM OXIDE PARTICLES, SUBSTRATE FOR MAGNETIC RECORDING MEDIUM AND MAGNETIC RECORDING MEDIUM USING THE SAME

[75] Inventors: Kazuyuki Hayashi; Keisuke Iwasaki; Yasuyuki Tanaka; Hiroko Morii, all of Hiroshima, Japan

[73] Assignee: Toda Kogyo Corporation, Japan

[21] Appl. No.: 08/990,880

[22] Filed: Dec. 15, 1997

[30] Foreign Application Priority Data

Dec. 16, 1996 [JP] Japan .................................. 8-353513

[51] Int. Cl.[7] ........................................................ G11B 5/68
[52] U.S. Cl. ........................... 428/323; 428/328; 428/329; 428/336; 428/402; 428/403; 428/694 BA; 428/694 BS; 428/900
[58] Field of Search ..................... 428/323, 328, 428/329, 336, 402, 403, 694 BA, 694 BS, 900

[56] References Cited

U.S. PATENT DOCUMENTS 5,750,250  5/1998  Hayashi et al. ........................ 428/328

FOREIGN PATENT DOCUMENTS 0 552 611 A1  7/1993  European Pat. Off. .
8-353513  12/1996  Japan .

OTHER PUBLICATIONS

Chemical Abstracts, vol. 108 (1988) Mar. 21, No. 12 Abstract No. 97189c, p. 160 XP–002060802 &I JP 62 235 215 Suzuki Manufacture and purification of rutile–type titanium oxide.

*Primary Examiner*—Stevan A. Resan
*Attorney, Agent, or Firm*—Nixon & Vanderhye

[57] ABSTRACT

The present invention relates to titanium oxide particles having an average particle size of not more than 0.3 $\mu$m, and a BET specific surface area of 15 to 200 m$^2$/g, containing a soluble sodium salt of not more than 230 ppm, calculated as Na, and a soluble sulfate of not more than 150 ppm, calculated as SO$_4$, and having a pH value of not less than 8. The titanium oxide particles of the present invention are suitable as non-magnetic particles for a non-magnetic undercoat layer of a magnetic recording medium which uses magnetic particles containing iron as a main ingredient, and even more particularly, are suitable as non-magnetic particles for a non-magnetic undercoat layer of a magnetic recording medium which uses magnetic particles containing iron as a main ingredient, show an excellent dispersibility in a binder resin, contain only a small amount of soluble sodium salt and soluble sulfate, and have a pH value of not less than 8.

17 Claims, No Drawings

TITANIUM OXIDE PARTICLES, SUBSTRATE FOR MAGNETIC RECORDING MEDIUM AND MAGNETIC RECORDING MEDIUM USING THE SAME

BACKGROUND OF THE INVENTION

The present invention relates to titanium oxide particles, a substrate for a magnetic recording medium and a magnetic recording medium using the substrate. More particularly, the present invention relates to titanium oxide particles suitable as non-magnetic particles for a non-magnetic undercoat layer of a magnetic recording medium which uses magnetic particles containing iron as a main ingredient, and even more particularly, to titanium oxide particles suitable as non-magnetic particles for a non-magnetic undercoat layer of a magnetic recording medium which uses magnetic particles containing iron as a main ingredient, which show an excellent dispersibility in a binder resin, which contain only a small amount of soluble sodium salt and soluble sulfate, and have a pH value of not less than 8, a substrate for the magnetic recording medium, and a magnetic recording medium using the substrate.

With a development of miniaturized and lightweight video or audio magnetic recording and reading-out apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic layer in order to improve these properties of a magnetic recording medium.

The enhancement of the properties of magnetic particles will first be described.

The properties which magnetic particles are required to have in order to satisfy the above-described demands on a magnetic recording medium, are a high coercive force and a large saturation magnetization.

As magnetic particles suitable for high-output recording and high-density recording, acicular magnetic particles containing iron as a main ingredient which are obtained by heat-treating acicular goethite particles or acicular hematite particles in a reducing gas, are widely known.

Although acicular magnetic particles containing iron as a main ingredient have a high coercive force and a large saturation magnetization, since the acicular magnetic particles containing iron as a main ingredient used for a magnetic recording medium are very fine particles having a particle size of not more than 0.3 $\mu$m, particularly, 0.01 to 0.2 $\mu$m, such particles easily corrode, and as a result, magnetic characteristics thereof are deteriorated, especially, the saturation magnetization and the coercive force are reduced.

Therefore, in order to maintain the characteristics of a magnetic recording medium which uses magnetic particles containing iron as a main ingredient as the magnetic particles over a long period, it is strongly demanded to suppress the corrosion of acicular magnetic particles containing iron as a main ingredient as much as possible.

A reduction of the thickness of a magnetic recording layer will now be described.

Video tapes have recently been required more and more to have a higher picture quality, and the frequencies of carrier signals recorded in recent video tapes are higher than those recorded in conventional video tapes. In other words, the carrier signals in the short-wave region have come to be used, and as a result, the magnetization depth from the surface of a magnetic tape has come to be remarkably small.

For the purpose of high-density recording, it is necessary to maintain the output characteristics, to reduce noise, and especially, to improve the S/N ratio with respect to signals having a short wavelength as well. In a magnetic recording medium composed of a substrate and a magnetic recording layer formed on the substrate, it have been conducted to reduce the thickness of the magnetic recording layer. This fact is described, for example, on page 312 of *Development of Magnetic Materials and Technique for High Dispersion of Magnetic Powder*, published by Sogo Gijutsu Center Co. Ltd. (1982), " . . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness. . . . "

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the substrate must also be smooth. This fact is described on pages 180 and 181 of *Materials for Synthetic Technology-Causes of Friction and Abrasion of Magnetic Tape and Head Running System and Measures for Solving the Problem* (hereinunder referred to as *Materials for Synthetic Technology* (1987), published by the publishing department of Technology Information Center, " . . . the surface roughness of a hardened magnetic layer depends on the surface roughness of a substrate (back surface roughness) so largely as to be approximately proportional, . . . since the magnetic layer is formed on the substrate, the more smooth the surface of the substrate is, the more uniform and larger head output is obtained and the more the S/N ratio is improved."

Secondly, there has been caused a problem in the strength of a non-magnetic substrate such as a base film with a tendency of the reduction in the thickness of a non-magnetic substrate which has been conventionally used in response to the demand for a thinner magnetic layer. This fact is described, for example, on page 77 of the above-described *Development of Magnetic Materials and Technique for High Dispersion of Magnetic Powder*, " . . . Higher recording density is a large problem assigned to the present magnetic tape. This is important in order to shorten the length of the tape so as to miniaturize a cassette and to enable long-time recording. For this purpose, it is necessary to reduce the thickness of a substrate . . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded."

The end portion of a magnetic recording medium such as a magnetic tape, especially, a video tape is judged by detecting a portion of the magnetic recording medium, at which the light transmittance is large by a video deck. As acicular magnetic particles containing iron as a main ingredient used for high-density recording, very fine particles are used as described above. With such a tendency of the reduction in the particle size of magnetic particles, and the thickness of the magnetic recording layer and substrate, the light transmittance of the magnetic recording medium tends to be larger, and as a result, it is difficult to detect the end of the magnetic tape by the video deck. For reducing the light transmittance of the magnetic recording medium, carbon black or the like is added to the magnetic recording layer. It is, therefore, essential to add carbon black or the like to a magnetic recording layer in the present video tapes.

However, addition of non-magnetic carbon black impairs not only the enhancement of the recording density but also the reduction of the thickness of the magnetic recording layer. It is, therefore, strongly demanded that the light transmittance of a magnetic recording layer should be small even if the amount of the carbon black or the like which is added thereto is reduced to small or zero. From this point of view, improvements in the substrate are now in strong demand.

On the other hand, there is no end to a demand for a higher performance in recent magnetic recording media. With the above-described reduction in the thickness of a magnetic recording layer and a non-magnetic substrate, since the durability of the surface of the magnetic recording layer and the magnetic recording medium itself lowers, an improvement of the durability of the surface of the magnetic recording layer and the magnetic recording medium itself is in strong demand.

This fact is described in Japanese Patent Application Laid-Open (KOKAI) No. 5-298679, " . . . With the recent development in magnetic recording, recording with a high picture quality and a high sound quality has increasingly been required. It is further required to improve the signal recording property, especially, to reduce noise and raise the C/N by making the surface of a magnetic tape smooth with the reduction of the particle size of ferromagnetic particles and the enhancement of the recording density. . . . However, the coefficient of friction between the magnetic tape and an apparatus during the travel of the magnetic tape increases, so that there is a tendency of the magnetic layer of the magnetic tape (magnetic recording medium) being damaged or exfoliated even in a short time. Especially, in a video tape, since the magnetic recording medium travels at a high speed in contact with the video head, the ferromagnetic particles are apt to be dropped from the magnetic layer, which may cause clogging on the magnetic head. Therefore, improvement in the running stability of the magnetic layer of a magnetic recording medium is expected. . . . "

Various attempts have been made to improve the substrate for a magnetic recording layer. A magnetic recording medium having at least one undercoat layer (hereinunder referred to as "non-magnetic undercoat layer") obtained by forming the dispersion composed of non-magnetic particles such as titanium oxide particles and a binder resin on a non-magnetic substrate such as a base film, has been proposed and put to practical use (Japanese Patent Publication No. 6-93297 (1994), Japanese Patent Application Laid-Open (KOKAI) Nos. 62-159338 (1987), 4-167225 (1992), 4-325915 (1992), 5-73882 (1993), 5-182177 (1993), 5-347017 (1993), 6-60362 (1994), 8-45062 (1996), etc.).

Particularly, Japanese Patent Application Laid-Open (KOKAI) No. 5-182177 (1993) describes as follows:

"The inorganic particles usable in the present invention include, for example, metals, metal oxides, metal carbonates, metal sulfates, metal nitrates, metal carbides and metal sulfides. Concretely, $TiO_2$, (rutile, anatase), $TiO_x$, cerium oxide, tin oxide, tungsten oxide, ZnO, $ZrO_2$, $SiO_2$, $Cr_2O_3$, a alumina having not less than 90% of α-formation ratio, β-alumina, γ-alumina, α-iron oxide, goethite, corundum, silicon nitrate, titanium carbide, magnesium oxide, boron nitrate, molybdenum disulfide, copper oxide, $MgCO_3$, $CaCO_3$, $BaCO_3$, $SrCO_3$, $BaSO_4$, silicon carbide, titanium carbide, etc. are used singly or in combination."

"As the inorganic particles, those satisfying the following conditions are preferable. The tap density is 0.05 to 2 g/cc, preferably 0.2 to 1.5 g/cc. The water content is 0.1 to 5 wt %, preferably 0.2 to 3 wt %. The pH value is 2 to 11, preferably 4 to 10. The specific surface area is 1 to 100 $m^2$/g, preferably 5 to 70 $m^2$/g, more preferably 7 to 50 $m^2$/g. The preferable crystal grain size is 0.01 to 2 μm. In the case of granular particles, the average particle size is not more than 0.1 μm, preferably not more than 0.08 μm. In the case of acicular particles, the major axial diameter is 0.05 to 1.0 μm, preferably 0.06 to 0.5 μm, the acicular ratio (aspect ratio) is 3 to 30, preferably 5 to 15. The oil absorption using DBP is 5 to 100 ml/100 g, preferably 10 to 80 ml/100 g, more preferably 20 to 60 ml/100 g. The SA (stearic acid) adsorption is 1 to 20 μmol/$m^2$, more preferably 2 to 15 μmol/$m^2$. The roughness factor of the particle surfaces is preferably 0.8 to 1.5. The heat of wetting to water at 25° C. is preferably 200 to 600 erg/$cm^2$. A solvent having the heat of wetting in the above range is also usable. The appropriate quantity of water molecules on the surface at 100 to 400° C. is in the range of 1 to 10/100 Å. The pH value in water at the isoelectric point is preferably 3 to 9. The specific gravity is 1 to 12, preferably 3 to 6. The ignition loss is preferably not more than 20%."

"As the non-magnetic inorganic particles used in the present invention, titanium oxide (particularly, titanium dioxide) is preferable. The process for preparing titanium oxide will be described in detail in the following.

As the process for preparing titanium oxide, a sulfuric acid method and a chlorine method are mainly used. In the sulfuric acid method, a raw ore such as ilmenite is distilled in sulfuric acid to extract Ti, Fe, etc. in the form of sulfates. After the iron sulfate is removed by crystallization separation, the remaining titanyl sulfate solution is filtered, purified and hydrolyzed under heating to precipitate hydrated titanium oxide. After filtering the precipitated hydrated titanium oxide out and washing it with water, the impurities are washed out, and a particle size regulator is added and calcined at a temperature of 80 to 1,000° C., thereby obtaining crude titanium oxide. The obtained crude titanium oxide is classified into the rutile titanium oxide and the anatase titanium oxide by the nuclear material added at the time of hydrolysis. The resultant crude titanium oxide is pulverized. After the dressing of grain and the surface treatment, the target titanium oxide is obtained.

In the chlorine method, natural rutile as a raw ore and synthesized rutile are used. The ore is chlorinated in the state of reduction at a high temperature, to that Ti is changed into $TiCl_4$ and Fe into $FeCl_2$. The iron oxide which is cooled into a solid is separated from liquid $TiCl_4$. After the crude $TiCl_4$ obtained is refined by fractionating, a nucleating agent is added thereto and instantaneously reacted with oxygen at a temperature not lower than 1000° C. to obtain crude titanium oxide. The finishing process for imparting a pigment quality to the crude titanium oxide produced in the oxidization separation process is the same as in the sulfuric acid method."

Japanese Patent Application Laid-Open (KOKAI) No. 5-347017 (1993) describes as follows:

"In the present invention, it is possible to appropriately select various known non-magnetic particles. Examples of the usable non-magnetic particles are carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, artificial diamond, $\alpha$-iron oxide, garnet, silica rock, silicon nitride, boron nitride, silicon carbide, molybdenum carbide, boron carbide, tungsten carbide, titanium carbide, tripoli, diatom and dolomite. Among these are preferable inorganic particles such as carbon black, $CaCO_3$, $TiO_2$, barium sulfate, $\alpha$-$Al_2O_3$, $\alpha$-$Fe_2O_3$, $\alpha$-FeOOH and $Cr_2O_3$, and polymer particles such as polyethylene powder."

"The major axial diameter of the non-magnetic particles is ordinarily not more than 0.50 $\mu$m, preferably not more than 0.40 $\mu$m, more preferably not more than 0.30 $\mu$m. The minor axial diameter of the non-magnetic particles is ordinarily not more than 0.10 $\mu$m, preferably not more than 0.08 $\mu$m, more preferably not more than 0.06 $\mu$m. The aspect ratio of the non-magnetic particles is ordinarily 2 to 20, preferably 5 to 15, more preferably 5 to 10. The aspect ratio here means the ratio (major axial diameter/minor axial diameter) of the major axial diameter to the minor axial diameter. The specific surface area of the non-magnetic particles is ordinarily 10 to 250 $m^2$/g, preferably 20 to 150 $m^2$/g, more preferably not more than 30 to 100 $m^2$/g."

As is clear from the above description, various inorganic particles are known as the non-magnetic particles for a non-magnetic undercoat layer. Especially, known titanium oxide particles which are fine particles having an excellent chemical resistance, are widely used.

The non-magnetic particles for a non-magnetic undercoat layer which are capable of not only reducing the thickness of a magnetic recording layer but also producing a substrate having as smooth a surface as possible and a high strength, which enable a thinner magnetic recording layer having a small light transmittance, an excellent surface smoothness and a uniform thickness to be formed on the substrate, and which are capable of suppressing a corrosion of the magnetic particles containing iron as a main ingredient which are dispersed in the magnetic recording layer, are now in the strongest demand, but no such non-magnetic particles have ever been obtained.

When commercially available titanium oxide particles or titanium oxide particle produced by coating on the surface of the available titanium oxide particles with an aluminum compound, are used as non-magnetic particles for a non-magnetic undercoat layer, it is impossible to sufficiently enhance the surface smoothness of the non-magnetic undercoat layer formed on the non-magnetic base film. As a result, when a magnetic recording layer is formed on such a non-magnetic undercoat layer, it is difficult to make a thin layer having a smooth surface and a uniform thickness. In addition, due to its process, the soluble sodium salt and the soluble sulfate contained in the titanium oxide particles necessarily cause the corrosion of the magnetic particles containing iron as a main ingredient which are dispersed in the magnetic recording layer, thereby greatly reducing the magnetic characteristics.

The fact that titanium oxide particles contain soluble sodium salt, soluble sulfate, etc. are described on page 77 of *Titanium Oxide-Physical Properties and Applied technique* (1991), (published by Gihodo Co., Ltd.) as follows: " . . . In titanium oxide, K, Na, Li, Mg, $PO_4$, $SO_4$ or Cl which is contained in conditioning agents and flocculants, remain as a water-soluble matter. In surface-treated titanium oxide, Na, $SO_4$, Cl as a by-product of the production of a surface-treating hydrate adsorbs to the hydrate.

Especially, when titanium oxide is treated with an alumina hydrate, it is apt to become difficult to remove the acid radical such as $SO_4$ due to the base of the alumina. On the other hand, when titanium oxide is treated with a silica hydrate, the silica firmly connects with the alkali metal ions Na, and the complete removal thereof is very difficult. . . . "

SUMMARY OF THE INVENTION

As a result of various studies to solve the above-described problems, it has been found that by pulverizing commercially available titanium oxide particles by a wet-process so that the amount of the coarse particles having a particle size of not less than 44 $\mu$m are not more than 10 wt % based on the total weight of particles, and treating the slurry obtained with an alkali at pH value of not less than 13 at a temperature of not lower than 80° C., the obtained titanium oxide particles which have an average particle size of not more than 0.3 $\mu$m and a BET specific surface area of not less than 15 $m^2$/g, which contain a soluble sodium salt of not more than 230 ppm (calculated as Na) and a soluble sulfate of not more than 150 ppm (calculated as $SO_4$) and which have a pH value of not less than 8, are capable of (1) providing a substrate having an excellent surface smoothness and a high strength, (2) forming a thin-film magnetic recording layer having a small light transmittance, an excellent surface smoothness and a uniform thickness, and (3) suppressing a corrosion of the magnetic particles containing iron as a main ingredient which are dispersed in the magnetic recording layer. On the basis of this finding, the present invention has been achieved.

It is an object of the present invention to provide non-magnetic particles for a non-magnetic undercoat layer which are capable of producing a substrate having an excellent surface smoothness and a high strength, which enable a thin magnetic recording layer having a small light transmittance, an excellent surface smoothness and a uniform thickness to be formed on the substrate, and which are capable of suppressing a corrosion of the magnetic particles containing iron as a main ingredient which are dispersed in the magnetic recording layer.

To accomplish these aims, in a first aspect of the present invention, there are provided titanium oxide particles which have an average particle size of not more than 0.3 $\mu$m and a BET specific surface area of 15 to 200 $m^2$/g, which contain a soluble sodium salt of not more than 230 ppm (calculated as Na) and a soluble sulfate of not more than 150 ppm (calculated as $SO_4$), and which have a pH value of not less than 8.

In a second aspect of the present invention, there is provided titanium oxide particles which have an average particle size of not more than 0.3 $\mu$m and a BET specific surface area of 15 to 200 $m^2$/g, which contain a soluble sodium salt of not more than 230 ppm (calculated as Na) and a soluble sulfate of not more than 150 ppm (calculated as $SO_4$), and which have a pH value of not less than 8, the surfaces of said particles being coated with at least one selected from the group consisting of a hydroxide of aluminum, an oxide of aluminum, a hydroxide of silicon and an oxide of silicon.

In a third aspect of the present invention, there is provided a substrate for a magnetic recording medium comprising:

a non-magnetic base film; and a non-magnetic undercoat layer formed on said non-magnetic base film, and comprising a binder resin and as non-magnetic particles, titanium oxide particles which have an average particle size of not more than 0.3 µm and a BET specific surface area of 15 to 200 m²/g, which contain a soluble sodium salt of not more than 230 ppm (calculated as Na) and a soluble sulfate of not more than 150 ppm (calculated as SO$_4$), and which have a pH value of not less than 8.

In a fourth aspect of the present invention, there is provided a substrate for a magnetic recording medium comprising:

a non-magnetic base film; and a non-magnetic undercoat layer formed on said non-magnetic base film, and comprising a binder resin and as non-magnetic particles, titanium oxide particles which have an average particle size of not more than 0.3 µm and a BET specific surface area of 15 to 200 m²/g, which contain a soluble sodium salt of not more than 230 ppm (calculated as Na) and a soluble sulfate of not more than 150 ppm (calculated as SO$_4$), and which have a pH value of not less than 8, the surfaces of said particles being coated with at least one selected from the group consisting of a hydroxide of aluminum, an oxide of aluminum, a hydroxide of silicon and an oxide of silicon.

In a fifth aspect of the present invention, there is provided a magnetic recording medium comprising:

a substrate for a magnetic recording medium, comprising a non-magnetic base film, and a non-magnetic undercoat layer formed on said non-magnetic base film and comprising a binder resin and as non-magnetic particles, titanium oxide particles which have an average particle size of not more than 0.3 µm and a BET specific surface area of 15 to 200 m²/g, which contain a soluble sodium salt of not more than 230 ppm (calculated as Na) and a soluble sulfate of not more than 150 ppm (calculated as SO$_4$), and which have a pH value of not less than 8; and a magnetic recording layer comprising magnetic particles containing iron as a main ingredient and a binder resin which is formed on said non-magnetic undercoat layer.

In a sixth aspect of the present invention, there is provided a magnetic recording medium comprising:

a substrate for a magnetic recording medium, comprising a non-magnetic base film and a non-magnetic undercoat layer formed on said non-magnetic base film and comprising a binder resin and as non-magnetic particles, titanium oxide particles which have an average particle size of not more than 0.3 µm and a BET specific surface area of 15 to 200 m²/g, which contain a soluble sodium salt of not more than 230 ppm (calculated as Na) and a soluble sulfate of not more than 150 ppm (calculated as SO$_4$), and which have a pH value of not less than 8, the surfaces of said particles being coated with at least one selected from the group consisting of a hydroxide of aluminum, an oxide of aluminum, a hydroxide of silicon and an oxide of silicon; and a magnetic recording layer comprising magnetic particles containing iron as a main ingredient and a binder resin which is formed on said non-magnetic undercoat layer.

DETAILED DESCRIPTION OF THE INVENTION

The titanium oxide particles according to the present invention will first be described.

The shape of the titanium oxide particles of the present invention may be granular, rice-ball shaped or acicular.

The average particle size of the titanium oxide particles is not more than 0.3 µm. Particularly, in the case of granular titanium oxide particles, the average particle diameter is ordinarily about 0.005 to 0.3 µm. When the average particle diameter is less than 0.005 µm, it is difficult to disperse the particles in a binder resin by the increase of the intermolecular force due to too fine particles, so that the non-magnetic undercoat layer produced by using such titanium oxide particles cannot be said to have a sufficient surface smoothness. On the other hand, when the average particle diameter exceeds 0.3 µm, although the dispersion of the particles in a binder resin is good, the particles become coarse, so that the non-magnetic undercoat layer produced by using such titanium oxide particles cannot have a sufficient surface smoothness. With the consideration of the dispersibility of the particles in a binder resin and the surface smoothness of a non-magnetic undercoat layer, the average particle diameter is preferably 0.02 to 0.2 µm, more preferably 0.03 to 0.18 µm.

If the shape of the titanium oxide particles is rice-ball shaped or acicular, the average major axial diameter is ordinarily about 0.005 to 0.3 µm, and the average minor axial diameter is ordinarily about 0.0025 to 0.15 µm.

When the average major axial diameter is less than 0.005 µm, it is difficult to disperse the particles in a binder resin by the increase of the intermolecular force due to too fine particles, so that the non-magnetic undercoat layer produced by using such titanium oxide particles cannot be said to have a sufficient surface smoothness. On the other hand, when the average major axial diameter exceeds 0.3 µm, although the dispersion of the particles in a binder resin is good, the particles become coarse, so that the non-magnetic undercoat layer produced by using such titanium oxide particles cannot have a sufficient surface smoothness.

When the average minor axial diameter is less than 0.0025 µm, it is difficult to disperse the particles in a binder resin by the increase of the intermolecular force due to too fine particles, so that the non-magnetic undercoat layer produced from the titanium oxide particles cannot be said to have a sufficient surface smoothness. On the other hand, when the average minor axial diameter exceeds 0.15 µm, although the dispersion of the particles in a binder resin is good, the particles become coarse, so that the non-magnetic undercoat layer produced by using such titanium oxide particles cannot have a sufficient surface smoothness.

In the consideration of the dispersibility of the particles into a binder resin and the surface smoothness of a non-magnetic undercoat layer, the average major axial diameter is preferably 0.02 to 0.3 µm, more preferably 0.05 to 0.3 µm, and the average minor axial diameter is preferably 0.005 to 0.1 µm, more preferably 0.01 to 0.08 µm.

The aspect ratio (average major axial diameter/average minor axial diameter) (hereinunder referred to simply as "aspect ratio") is ordinarily not less than 2:1, preferably not less than 3:1. In the consideration of the dispersibility of the particles into a binder resin, the upper limit is ordinarily 20:1, preferably 10:1.

The BET specific surface area ($S_{BET}$) of the titanium oxide particles of the present invention is about 15 to 200 m²/g.

When the BET specific surface area is less than 15 m²/g, although the dispersibility of the particles into a binder resin is good, the particles become coarse, so that the non-magnetic undercoat layer produced by using such titanium oxide particles cannot have a sufficient surface smoothness.

If the BET specific surface area exceeds 200 m²/g it is difficult to disperse the particles in a binder resin by the increase of the intermolecular force due to too fine particles, so that the non-magnetic undercoat layer produced by using such titanium oxide particles cannot be said to have a sufficient surface smoothness. In the consideration of the dispersibility of the particles into a binder resin and the surface smoothness of a non-magnetic undercoat layer, the BET specific surface area is preferably 20 to 100 m²/g, more preferably 35 to 80 m²/g.

The content of soluble sodium salt in the titanium oxide particles is not more than 230 ppm (calculated as Na).

If the content exceeds 230 ppm, the magnetic particles containing iron as a main ingredient contained in the magnetic recording layer formed on the non-magnetic undercoat layer are gradually corroded, thereby causing the deterioration in the magnetic characteristics. In addition, the dispersibility of the titanium oxide particles in a binder resin is likely to be deteriorated, efflorescence is caused in some state of preservation, particularly in a circumstance of a high humidity. In the consideration of the prevention of the corrosion of the magnetic particles containing iron as a main ingredient, the content of soluble sodium salt is preferably not more than 200 ppm, more preferably not more than 160 ppm, even more preferably not more than 150 ppm. From the point of view of industry such as productivity, the lower limit is about 0.01 ppm.

The content of soluble sodium sulfate in the titanium oxide particles is not more than 150 ppm (calculated as $SO_4$). If the content exceeds 150 ppm, the magnetic particles containing iron as a main ingredient contained in the magnetic recording layer formed on the non-magnetic undercoat layer are gradually corroded, thereby causing the deterioration in the magnetic characteristics. In addition, the dispersibility of the titanium oxide particles in a binder resin is likely to be deteriorated, efflorescence is caused in some state of preservation, particularly in a circumstance of a high humidity. In the consideration of the prevention of the corrosion of the magnetic particles containing iron as a main ingredient, the content of soluble sodium salt is preferably not more than 100 ppm, more preferably not more than 70 ppm. From the point of view of industry such as productivity, the lower limit is about 0.01 ppm.

The content of soluble chloride in the titanium oxide particles according to the present invention is ordinarily not more than 100 ppm, preferably not more than 80 ppm, more preferably not more than 50 ppm, even more preferably not more than 30 ppm (calculated as Cl).

The pH value of the titanium oxide particles is not less than 8, ordinarily 8 to 12. If the pH value is less than 8, the magnetic particles containing iron as a main ingredient contained in the magnetic recording layer formed on the non-magnetic undercoat layer are gradually corroded, thereby causing the deterioration in the magnetic characteristics. In the consideration of the prevention of the corrosion of the magnetic particles containing iron as a main ingredient, the pH value is preferably 8.3 to 11, more preferably 8.5 to 10.5, even more preferably 8.8 to 10.5.

In the titanium oxide particles of the present invention, a geometrical standard deviation which is an index of the degree of a particle size distribution based on the particle size (the major axial diameter in the case of rice-ball shaped or acicular particles), is not more than 1.5. The smaller the geometrical standard deviation, the better the particle size distribution. If the geometrical standard deviation exceeds 1.5, the coarse particles existent in the titanium oxide particles are apt to make a uniform dispersion into a binder resin difficult, so that it is difficult to produce a non-magnetic undercoat layer having a smooth surface from such titanium oxide particles. In the consideration of the dispersibility of the particles into a binder resin and the surface smoothness of a non-magnetic undercoat layer, the geometrical standard deviation is preferably not more than 1.48, more preferably not more than 1.43. The lower limit of the geometrical standard deviation which is an index of the degree of the particle size distribution based on the particle size is ordinarily about 1.05, preferably about 1.01 with the consideration of the industrial productivity.

The titanium oxide particles according to the present invention are particles having a high degree of denseness, that is, such particles are easily packed into a non-magnetic under coat layer. If the degree of denseness is represented by "$S_{BET}/S_{TEM}$", wherein $S_{BET}$ is represents a specific surface area measured by a BET method and $S_{TEM}$ is represents a surface area calculated from the average particle diameter measured from the particles in an electron microphotograph, the $S_{BET}/S_{TEM}$ ratio of the titanium oxide particles of the present invention is ordinarily 0.5 to 3.0:1. In the consideration of the dispersibility of the particles into a binder resin and the surface smoothness of a non-magnetic undercoat layer, the $S_{BET}/S_{TEM}$ ratio is preferably 0.7 to 2.5:1, more preferably 0.8 to 2.3:1.

The surfaces of the titanium oxide particles of the present invention may be coated with at least one selected from the group consisting of a hydroxide of aluminum, an oxide of aluminum, a hydroxide of silicon and an oxide of silicon, if necessary, in order to enhance the affinity with a binder resin and improve the dispersibility when they are dispersed into the binder resin.

The amount of coating compound is 0 to 50 wt %, preferably 0.01 to 50 wt % (calculated as Al); 0 to 50 wt %, preferably 0.01 to 50 wt % (calculated as $SiO_2$); or 0 to 50 wt %, preferably 0.01 to 50 wt % (calculated as the total sum of Al and $SiO_2$). If it is less than 0.01 wt %, the coating of the particles may hardly exert a dispersibility-improving effect. If the amount exceeds 50.00 wt %, the dispersibility-improving effect becomes saturated, so that it is meaningless to treat the particles more than necessary. From the point of view of dispersibility in a resin binder, the more preferable amount of coating compound is 0.05 to 20 wt %, even more preferably 0.05 to 13 wt % (calculated as Al, $SiO_2$ or the total sum of Al and $SiO_2$).

The titanium oxide particles coated with the above-described coating compound have the average particle diameter, the content of soluble sodium salt content, the content of soluble sulfate and the pH value which are approximately the same as the titanium oxide particles before being coated. This is because in the titanium oxide particles of the present invention before coating, the agglomerates are sufficiently separated into discrete particles, it is easy to remove the compound adsorbed to the particles such as Na and $SO_4$ as a by-product during the coating treatment, by washing it with water.

From a similar reason, the particle size distribution, the degree of denseness and the content of soluble chloride in the titanium oxide particles coated with the above-described coating compound are approximately the same as in the titanium oxide particles before coating.

The substrate according to the present invention will now be described.

The substrate of the present invention comprises a non-magnetic base film and a non-magnetic undercoat layer comprising non-magnetic particles and a binder resin, which is formed on the non-magnetic base film. The substrate has a thickness of ordinarily 2.2 to 310 μm, preferably 2.5 to 60 μm, more preferably 3.0 to 25 μm.

As the non-magnetic base film, materials which are at present generally used for the production of a magnetic recording medium are usable, for example, a synthetic resin film such as polyethylene terephthalate, polyethylene, polypropylene, polycarbonate, polyethylene naphthalate, polyamide, polyamideimide and polyimide; foil and sheet of a metal such as aluminum and stainless steel, etc.; and various kinds of paper. The thickness of the non-magnetic base film varies depending upon the material, but it is ordinarily 1.0 to 300 μm, preferably 2.0 to 200 μm. In the case of a magnetic disc, polyethylene terephthalate is ordinarily used as the non-magnetic support, and the thickness thereof is ordinarily 50 to 300 μm, preferably 60 to 200 μm. In the case of a magnetic tape, polyethylene terephthalate having a thickness of ordinarily 3 to 100 μm, preferably 4 to 20 μm, polyethylene naphthalate having a thickness of ordinarily 3 to 50 μm, preferably 4 to 20 μm, or polyamide having a thickness of ordinarily 1 to 10 μm, preferably 3 to 7 μm is used.

The non-magnetic undercoat layer contains titanium oxide particles as the non-magnetic particles and a binder resin. The film thickness of the non-magnetic undercoat layer is ordinarily 0.2 to 10.0 μm, preferably 0.5 to 5.0 μm. If the thickness is less than 0.2 μm, not only may it be difficult to ameliorate the surface roughness of the non-magnetic base film but also the strength may be insufficient and it may be difficult to reduce the light transmittance. A thickness exceeding 10.0 μm is permissible, but a thickness of not more than 10.0 μm is preferable in order to reduce the thickness of a magnetic recording medium.

As the binder resin in the non-magnetic undercoat layer, the resins which are generally used for the production of a magnetic recording medium are usable, for example, vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate polymer, electron radiation curing acryl urethane resin and mixtures thereof. Each of these resin binders may have a polar group such as —OH, —COOH, —SO$_3$M, —OPO$_2$M$_2$ and —NH$_2$, wherein M represents H, Na or K.

The mixing ratio of the titanium oxide particles with the binder resin is ordinarily 5 to 2000 parts by weight, preferably 100 to 1500 parts by weight, more preferably 350 to 1000 parts by weight based on 100 parts by weight of the binder resin. If the mixing ratio of the titanium oxide particles is less than 5 parts by weight based on 100 parts by weight of the binder resin, since the quantity of titanium oxide particles in the coating compound is too small, when a coating film is produced therefrom, it is difficult to obtain a layer with the titanium oxide particles uniformly dispersed, so that it is difficult to obtain the surface smoothness aimed at and the strength of the substrate cannot be said to be sufficient. On the other hand, if the mixing ratio of the titanium oxide particles exceeds 2000 parts by weight based on 100 parts by weight of the binder resin, since the quantity of titanium oxide particles is too large with respect to the binder resin, it is difficult to obtain a sufficient dispersibility of the titanium oxide particles in the non-magnetic coating compound, so that it is difficult to produce a coating film having a sufficient surface smoothness. In addition, since the titanium oxide particles are not adequately bound by the binder resin, the coating film obtained is apt to become frail.

The non-magnetic undercoat layer may contain a lubricant, a polishing agent, an antistatic agent, etc. which are generally used for the production of a magnetic recording medium.

The substrate of the present invention comprising a non-magnetic base film and a non-magnetic undercoat layer comprising the non-magnetic particles and the binder resin, which is formed on the non-magnetic base film, has a gloss of ordinarily 140 to 280%, preferably 145 to 280%, and a surface roughness Ra of ordinarily 1.0 to 15.0 nm, preferably 1.0 to 14.0 nm, more preferably 1.0 to 13.0 nm. The Young's modulus (relative value to a commercially available video tape: AV T-20 produced by Victor Company of Japan, Limited) of the coating film is ordinarily 105 to 150, preferably 110 to 150.

The magnetic recording medium according to the present invention will now be described.

The magnetic recording medium according to the present invention comprises the substrate comprising the non-magnetic base film and the non-magnetic undercoat layer formed on the non-magnetic base film, and a magnetic recording layer formed on the non-magnetic undercoat layer.

The magnetic recording layer in the magnetic recording medium of the present invention comprises magnetic particles containing iron as a main ingredient and a binder resin. The film thickness of the magnetic recording layer is ordinarily 0.01 to 3.0 μm, preferably 0.05 to 2.0 μm. If the film thickness is less than 0.01 μm, uniform coating may be difficult, so that unfavorable phenomenon such as an unevenness of the coated surface is observed. On the other hand, when the thickness exceeds 3.0 μm, it may be difficult to obtain desired electromagnetic transducing characteristics due to an influence of diamagnetism.

The magnetic particles containing iron as a main ingredient used in the magnetic recording layer have an average major axial diameter of ordinarily 0.01 to 0.30 μm, preferably 0.01 to 0.20 μm, and an aspect ratio of ordinarily not less than 3:1, preferably not less than 5:1. The upper limit of the aspect ratio is ordinarily 15:1, preferably 10:1 with due consideration of the dispersibility in the binder resin. The shape of the magnetic particles containing iron as a main ingredient may have not only acicular but also spindle, rice-ball shaped or the like.

The magnetic particles containing iron as a main ingredient (hereinafter refer to as "magnetic iron-based metal particles") used in the present invention comprises iron and at least one selected from the group consisting of Co, Al, Ni, P, Si, Zn, Cu, B, Nd, La and Y. Further, the following magnetic iron-based metal particles are exemplified.

1) Magnetic iron-based metal particles comprises iron; and Co of ordinarily 0.05 to 40 wt %, preferably 1.0 to 35 wt %, more preferably 3 to 30 wt % (calculated as Co) based on the weight of the magnetic iron-based metal particles.

2) Magnetic iron-based metal particles comprises iron; and Al of ordinarily 0.05 to 10 wt %, preferably 0.1 to 7 wt % (calculated as Al) based on the weight of the magnetic iron-based metal particles.

3) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and Al of ordinarily 0.05 to 10 wt %, preferably 0.1 to 7 wt % (calculated as Al) based on the weight of the magnetic iron-based metal particles.

4) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

5) Magnetic iron-based metal particles comprises iron; Al of ordinarily 0.05 to 10 wt %, preferably 0.1 to 7 wt % (calculated as Al) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

6) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; and at least one selected from the group consisting of Nd, La and Y of ordinarily 0.05 to 10 wt %, preferably 0.1 to 7 wt % (calculated as the corresponding element) based on the weight of the magnetic iron-based metal particles.

7) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

8) Magnetic iron-based metal particles comprises iron; Al of ordinarily 0.05 to 10 wt %, preferably 0.1 to 7 wt % (calculated as Al) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

9) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

10) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

11) Magnetic iron-based metal particles comprises iron; Al of ordinarily 0.05 to 10 wt %, preferably 0.1 to 7 wt % (calculated as Al) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

12) Magnetic iron-based metal particles comprises iron; Co of ordinarily 0.05 to 40 wt %, preferably 1.0 to 35 wt %, more preferably 3 to 30 wt % (calculated as Co) based on the weight of the magnetic iron-based metal particles; Al of ordinarily 0.05 to 10 wt %, preferably 0.1 to 7 wt % (calculated as Al) based on the weight of the magnetic iron-based metal particles; at least one selected from the group consisting of Nd, La and Y of ordinarily 0.05 to 10 wt %, preferably 0.1 to 7 wt % (calculated as the corresponding element) based on the weight of the magnetic iron-based metal particles; and at least one selected from the group consisting of Ni, P, Si, Zn, Cu and B of ordinarily 0.05 to 10 wt %, preferably 0.1 to 7 wt % (calculated as the corresponding element) based on the weight of the magnetic iron-based metal particles.

The iron content in the particles is the balance, and is preferably 50 to 99.9 wt %, more preferably 60 to 95 wt % (calculated as Fe) based on the weight of the magnetic iron-based metal particles.

The magnetic iron-based metal particles comprising (i) iron, cobalt and Al, or (ii) iron, cobalt, Al and at least one rare-earth metal such as Nd, La and Y is preferable from the point of the durability of the magnetic recording medium. Further, the magnetic iron-based metal particles comprising iron, cobalt and Al is more preferable.

With respect to the existing position of aluminum, it may be contained only in the core and inside portions, or in the surface portion of the magnetic iron-based metal particles. Alternatively, aluminum may be approximately uniformly contained in the magnetic iron-based metal particles from the core portion to the surface. An aluminum-coating layer may be formed on the surfaces of the particles. In addition, any of these positions may be combined. In the consideration of the effect of improving the surface characteristics of the magnetic recording layer or the durability of the magnetic recording medium, magnetic iron-based metal particles uniformly containing aluminum from the core portion to the surface and coated with an aluminum-coating layer are more preferable.

When the content of aluminum is less than 0.05 wt % (calculated as Al), the adsorption of the magnetic iron-based metal particles to the resin in the vehicle may not be said sufficient, so that it is difficult to produce a magnetic recording layer or a magnetic recording medium having a high durability. When the content of aluminum exceeds 10 wt %, the effect of improving the durability of the magnetic recording layer or the magnetic recording medium is observed, but the effect is saturated and it is meaningless to add aluminum more than necessary. Further more, the magnetic characteristics of the magnetic iron-based metal particles are sometimes deteriorated due to an increase in the aluminum as a non-magnetic component.

It is more preferable to produce a magnetic recording medium of the present invention using the magnetic iron-based metal particles containing Al and a rare-earth metal such as Nd, LA and Y therein, because the magnetic recording layer or magnetic recording medium produced is apt to have a more excellent durability. Especially, magnetic iron-based metal particles containing Al and Nd therein are the even more preferable.

As to the magnetic characteristics of the magnetic iron-based metal particles used in the present invention, the coercive force is preferably 1200 to 3200 Oe, more preferably 1500 to 3000 Oe, and the saturation magnetization as is preferably 100 to 170 emu/g, more preferably 130 to 170 emu/g with due consideration of the properties such as high-density recording.

As the binder resin in the magnetic recording layer, the binder resin used for the non-magnetic undercoat layer is also usable.

The mixing ratio of the magnetic iron-based metal particles with the binder resin in the magnetic recording layer is ordinarily 200 to 2000 parts by weight, preferably 300 to 1500 parts by weight, more preferably 350 to 1000 parts by weight based on 100 parts by weight of the binder resin. If the mixing ratio of the magnetic iron-based metal particles is less than 200 parts by weight, since the quantity of magnetic iron-based metal particles in the magnetic layer is too small, it is difficult to obtain the residual magnetic flux density necessary for high-density recording.

On the other hand, if the mixing ratio of the magnetic iron-based metal particles exceeds 2000 parts by weight, since the quantity of binder resin is too small with respect to the magnetic iron-based metal particles, it is difficult to obtain a sufficient dispersibility, so that the surface smoothness of the magnetic recording layer becomes insufficient. In addition, since the magnetic iron-based metal particles are not adequately bound by the binder resin, the coating film obtained is apt to be very frail.

The magnetic recording layer may contain a lubricant, a polishing agent, an antistatic agent, etc. which are generally used for the production of a magnetic recording medium.

The magnetic recording medium according to the present invention has a coercive force of ordinarily 900 to 3500 Oe, preferably 1000 to 3500 Oe, more preferably 1500 to 3500 Oe; a squareness (residual magnetic flux (Br)/saturation magnetic flux density (Bm)) of ordinarily 0.85 to 0.95, preferably 0.86 to 0.95. The gloss of the surface of the coating film is ordinarily 180 to 300%, preferably 190 to 300%, the surface roughness Ra of the coating film is ordinarily not more than 15.0 nm, preferably 2.0 to 12.0 nm, more preferably 3.0 to 10.0 nm, the linear adsorption coefficient is ordinarily 1.15 to 2.00 $\mu m^{-1}$, preferably 1.20 to 2.00 $\mu m^{-1}$, the Young's modulus (relative value to a commercially available video tape: AV T-120 produced by Victor Company of Japan, Limited) of the coating film is ordinarily 110 to 150, preferably 115 to 150, the corrosiveness represented by a rate of change (%) in the coercive force is ordinarily not more than 10.0%, preferably not more than 9.5%, more preferably not more than 9.0%, and the corrosiveness represented by a rate of change in the saturation magnetic flux density (Bm) is ordinarily not more than 10.0%, preferably not more than 9.5%. As to the durability, the running durability is ordinarily not less than 10 minutes, preferably not less than 15 minutes, more preferably not less than 22 minutes, and the scratch resistance is usually A or B, preferably A when evaluated into 4 ranks: A, B, C and D.

The process for producing the titanium oxide particles according to the present invention will now be described.

As the starting material for the titanium oxide particles of the present invention, commercially available titanium oxide particles may be used, and a titanium oxide particles obtained by either a sulfuric acid method or a chlorine method are also usable.

In the sulfuric acid method, iron sulfate is crystallized and separated from the sulfate of Ti and Fe obtained by the reaction of an ilmenite ore and concentrated sulfuric acid, and after the remaining titanyl sulfate is filtered and purified, the precipitate of titanium oxide hydroxide is obtained by hydrolysis. After the titanium oxide hydroxide is filtered out and washed, a particle size regulator, an agent for accelerating or regulating the transfer of the titanium oxide to rutile titanium oxide, a crystallization stabilize, a sintering preventive agent, etc. are added and mixed, and the resultant mixture is heat-treated at 700 to 1100° C. so as to obtain crude titanium oxide. The crude titanium oxide is then wished with water for purification to obtain titanium oxide.

In the chlorine method, the gas of the chlorides of Ti, Fe, etc. obtained by reacting a natural rutile ore or a synthesized rutile ore obtained by treating an ilmenite ore with chlorine gas in the state of reduction at a high temperature, is cooled to obtain a solidified iron chloride and liquefied titanium tetrachloride. The liquid titanium tetrachloride after the separation of the iron chloride is purified by rectification, a crystallization stabilizer is added thereto and the resultant mixture is preheated to about 1000° C. The preheated mixture is charged into an oxidization furnace and oxygen preheated to the same temperature is jetted into the oxidization furnace for carrying out oxidization reaction so as to obtain crude titanium oxide particles. The crude titanium oxide particles are then washed with water for purification to obtain titanium oxide particles.

The crude titanium oxide particles produced by the sulfuric acid method have an average particle size of ordinarily about 0.04 to 0.3 $\mu m$ and a BET specific surface area of ordinarily 7 to 230 $m^2/g$, and contain ordinarily about 500 to 3000 ppm of soluble sodium salt (calculated as Na) and ordinarily about 1000 to 2000 ppm of soluble sulfate (calculated as $SO_4$). The pH value of the particles is ordinarily about 3 to 6. The particle size distribution based on the particle size in the geometrical standard deviation is ordinarily not less than 1.51.

The crude titanium oxide particles produced by the chlorine method have an average particle size of ordinarily about 0.04 to 0.3 $\mu m$ and a BET specific surface area of ordinarily 7 to 230 $m^2/g$, and contain ordinarily about 500 to 3000 ppm of soluble sodium salt (calculated as Na), ordinarily about 500 to 1000 ppm of soluble sulfate (calculated as $SO_4$) and ordinarily about 100 to 1000 ppm of soluble chloride (calculated as Cl). The pH value of the particles is ordinarily about 3 to 6. The particle size distribution based on the particle size in the geometrical standard deviation is ordinarily not less than 1.51.

The titanium oxide particles obtained by washing the crude titanium oxide particles produced by the sulfuric acid method or by the chlorine method, with water and purifying them, have an average particle size of ordinarily about 0.04 to 0.3 $\mu m$ and a BET specific surface area of ordinarily 7 to 230 $m^2/g$, and contain ordinarily about 250 to 460 ppm of soluble sodium salt (calculated as Na), ordinarily about 260 to 360 ppm of soluble sulfate (calculated as $SO_4$) and ordinarily about 100 to 500 ppm of soluble chloride (calculated as Cl). The pH value of the particles is ordinarily not more than 7.9. The particle diameter distribution based on the particle size in the geometrical standard deviation is ordinarily not less than 1.51.

The titanium oxide particles according to the present invention are produced by using commercially available titanium oxide particles having an average particle size of 0.04 to 0.3 μm and a BET specific surface area of 7 to 230 m$^2$/g as a starting material, roughly pulverizing the commercially available titanium oxide particles by a dry process so as to loosen the agglomerates, forming the particles into a slurry, and further loosening the coarse particles by wet pulverization. In the wet pulverization, a ball mill, a sand grinder or the like is used so that the percentage of the coarse particles having a particle size of not less than 44 μm is not more than 10 wt %, preferably not more than 5 wt %, more preferably 0 wt % based on the weight of the total amount of the titanium oxide particles. If more than 10 wt % of coarse particles having a particle size of not less than 44 μm are existing, it is difficult to obtain an effect of treating the particles in an aqueous alkali solution at the next step.

An aqueous alkali solution such as sodium hydroxide is added to the slurry containing the titanium oxide particles in which coarse particles are removed therefrom so as to adjust the pH value at room temperature to not less than 13, and then heat-treated at a temperature of not lower than 80° C.

The concentration of the alkaline suspension containing titanium oxide particles and having a pH value of not less than 13 is preferably 50 to 250 g/liter.

If the pH value of the alkaline suspension containing titanium oxide particles is less than 13, it is difficult to effectively remove the crosslinked solid material caused by the particle size regulator, the agent for accelerating or regulating the transfer of the titanium oxide to rutile titanium oxide, the crystallization stabilizer, the sintering preventive agent, etc. which exist on the surfaces of the titanium oxide particles, so that it is difficult to wash out the soluble sodium slat, soluble sulfate, etc. which exist within and on the surfaces of the particles. The upper limit of the pH value is 14. In the consideration of the effect of removing the crosslinked solid material caused by the particle size regulator, the agent for accelerating or regulating the transfer of the titanium oxide to rutile titanium oxide, the crystallization stabilizer, the sintering preventive agent, etc. which exist on the surfaces of the titanium oxide particles, the effect of washing out the soluble sodium slat, soluble sulfate and if necessary, soluble chloride, and the effect of removing the alkali which adheres to the surfaces of the titanium oxide particles in the process of the above-mentioned alkali treatment with the aqueous alkali solution, the preferably pH value is in the range of 13.1 to 13.8.

The heating temperature of the alkaline suspension is preferably 80 to 103° C., more preferably 90 to 100° C. If the temperature is lower than 80° C., it may be difficult to effectively remove the crosslinked solid material caused by the particle size regulator, the agent for accelerating or regulating the transfer of the titanium oxide to rutile titanium oxide, the crystallization stabilizer, the sintering preventive agent, etc. which exist on the surfaces of the titanium oxide particles. If the heating temperature exceeds 103° C., although it is possible to effectively remove the crosslinked solid material, since an autoclave or the like is necessary and the treated solution boils under a normal pressure, it is not advantageous from the point of view of industry and economy.

The time for heating the alkaline suspension is preferably not less than 30 minutes, more preferably not less than 60 minutes, even more preferably not less than 120 minutes. The upper limit of the heating time is preferably about 6 hours. If the heating time is less than 30 minutes, it may be difficult to obtain an effect aimed at by the present invention. Even if the heating time exceeds 6 hours, the effect aimed at by the present invention is obtained, but the effect is saturated.

The titanium oxide particles heat-treated in the aqueous alkali solution are thereafter filtered out and washed with water by an ordinary method so as to remove the soluble sodium salt and soluble sulfate which are washed out of the insides and the surfaces of the particles, and the alkali which is adhered to the surfaces of the titanium oxide particles in the process of treatment with the aqueous alkali solution, and then dried.

As the washing method of the particles with water, a method generally industrially used such as a decantation method, a dilution method using a filter thickener and a method of passing water into a filter press is adopted.

The titanium oxide particles may be then coated with at least one selected from the group consisting of a hydroxide of aluminum, an oxide of aluminum, a hydroxide of silicon and an oxide of silicon.

In order to coat the titanium oxide particles, after the alkaline suspension containing the titanium oxide particles is heat-treated, they are filtered out and washed with water by an ordinary method, and re-dispersed in an aqueous solution to obtain a suspension. An aluminum compound, a silicon compound, or both aluminum and silicon compounds are added to the suspension, and the pH value is adjusted to coat the titanium oxide particles with at least one selected from the group consisting of a hydroxide of aluminum, an oxide of aluminum, a hydroxide of silicon and an oxide of silicon. The titanium oxide particles are then filtered out, washed with water, dried and pulverized. They may be further deaerated and compact-treated, if necessary.

As the aluminum compound, aluminum salts such as aluminum acetate, aluminum sulfate, aluminum chloride and aluminum borate; alkali aluminate such as soda aluminate; a hydroxide of aluminum; an oxide of aluminum; and aluminum sol are usable.

The amount of aluminum compound added is 0 to 50.00 wt %, ordinarily 0.01 to 50.00 wt % (calculated as Al) based on the weight of the titanium oxide particles. If the amount exceeds 50.00 wt %, since the effect of improving the dispersibility becomes saturated, addition of an aluminum compound more than necessary is meaningless.

As the silicon compound, silicates such as sodium orthosilicate, sodium metasilicate and potassium silicate; a hydroxide of silicon; an oxide of silicon; water glass 3 and colloidal silica are usable.

The amount of silicon compound added is 0 to 50.00 wt %, ordinarily 0.01 to 50.00 wt % (calculated as SiO$_2$) based on the weight of the titanium oxide particles. If the amount exceeds 50.00 wt %, since the effect of improving the dispersibility becomes saturated, addition of an aluminum compound more than necessary is meaningless.

When both an aluminum compound and a silicon compound are used, the total amount thereof used is 0 to 50.00 wt %, preferably 0.01 to 50.00 wt % (calculated as Al and SiO$_2$) based on the weight of the titanium oxide particles.

In case where the soluble sodium salt, soluble sulfate and, if necessary, soluble chloride contained in the titanium oxide particles are washed out with water, when the particle surfaces are, thereafter, coated with at least one selected from the group consisting of hydroxide of aluminum, an oxide of aluminum, a hydroxide of silicon and an oxide of silicon, even if soluble sodium salt or soluble sulfate is adhered, it is easy to remove it by washing it with water.

The process for producing the substrate will now be described.

A non-magnetic undercoat layer is produced by applying a non-magnetic coating composition comprising the non-magnetic particles, the binder resin and a solvent onto a non-magnetic base film and drying the applied composition.

As the solvent in the non-magnetic coating composition, methyl ethyl ketone, toluene, cyclohexanone, methylisobutyl ketone, tetrahydrofuran, etc. which are generally used for the production of a magnetic recording medium, are usable.

The mixing ratio of the solvent in the non-magnetic coating composition is preferably 50 to 95 parts by weight based on 100 parts by weight of the non-magnetic coating composition.

The process for producing the magnetic recording medium will now be described.

A magnetic recording layer is produced by applying a magnetic coating composition comprising the magnetic iron-based metal particles, the binder resin and a solvent on the non-magnetic undercoat layer and drying the applied composition.

As the solvent in the magnetic coating composition, the same solvent used for the non-magnetic coating composition is usable.

The mixing ratio of the solvent in the magnetic coating composition is preferably 50 to 95 parts by weight based on 100 parts by weight of the magnetic coating composition.

It is essential in the present invention that when the titanium oxide particles showing an excellent dispersibility in the binder resin, containing not more than 230 ppm of soluble sodium salt (calculated as Na) and not more than 150 ppm of soluble sulfate (calculated as $SO_4$), and having a pH value of not less than 8 are used as the non-magnetic particles for a non-magnetic undercoat layer, it is possible to enhance the surface smoothness and the strength of the non-magnetic undercoat layer owing to the excellent dispersibility of the particles in the binder resin, and than when a magnetic recording layer is formed on the non-magnetic undercoat layer, it is possible to reduce the light transmittance of the magnetic recording layer, thereby forming a smooth and uniform thin film, and suppressing a deterioration in the magnetic characteristics caused by the corrosion of the magnetic iron-based metal particles which are dispersed in the magnetic recording layer.

The reason why the surface smoothness of the non-magnetic undercoat layer and the strength of the substrate are enhanced, is considered as follows. Since it is possible to sufficiently remove the soluble sodium salt and the soluble sulfate, which agglomerate the titanium oxide particles by firm crosslinking, by washing the particles with water, the agglomerates are loosened into substantially discrete particles, so that titanium oxide particles having an excellent dispersion in the vehicle are obtained.

This fact will be explained in the following.

Crude titanium oxide particles ordinarily form firm agglomerates due to the process for production the same.

The titanium oxide particles produced by the sulfuric acid method will first be explained. The titanium oxide hydroxide particles produced as an intermediate product by the sulfuric acid method contain a large amount of sulfate [$SO_4^-$] derived from concentrate sulfuric acid used as an auxiliary raw material, and also contain a metal salt such as Na derived from the material ore. These sulfate and metal salt are contained in the particles in the form of slightly soluble sulfates, so that it is impossible to remove these salts by washing with water by an ordinary method.

These slightly soluble sulfates are changed to a soluble sodium salt and a soluble sulfate in the subsequent heat-treatment step for producing crude titanium oxide particles.

The soluble sodium salt and soluble sulfate are firmly bonded in the insides or the surfaces of the titanium oxide particles by a sintering preventive agent, which is essential for preventing the deformation of the shapes of the particles and sintering between particles in the heat-treatment at a high temperature such as about 900° C., so that agglomeration between the titanium oxide particles becomes more firmer.

As a result, the soluble sulfate and the soluble sodium salt, especially, confined in the insides of the particles or the agglomerates become very difficult to remove by an ordinary water-washing method.

Furthermore, the titanium oxide particles contain a soluble chloride as well as the above-described soluble sulfate and soluble sodium salt.

When titanium oxide particles having a rutile crystal structure are produced, a seed containing HCl for accelerating the transfer to a rutile is added as well as a salt such as Li, Mg, Zn and Al as a rutile crystallization stabilizer before the heat-treatment step, so that a chloride is apt to remain in addition to the above-described slightly soluble sulfates.

The titanium oxide particles produced by the chlorine method will now be explained. In the chlorine method, a synthetic rutile ore is used as a raw material ore. The synthetic rutile is obtained by adding coke to an ilmenite roe, reducing $Fe_2O_3$ to FeO at a temperature of 900° C., magnetically separating FeO, adding sulfate thereto, filtering out and separating the impurities such as iron, and heat-treating the remaining titanium oxide. Therefore, the thus-obtained titanium oxide particles inevitably contain sulfate.

The titanium tetrachloride solution produced as an intermediate product containing a large amount of sulfate also contain a large amount of chloride produced by the reaction of chlorine gas used as an auxiliary raw material with a metal salt such as Na contained in a raw material ore such as a natural rutile ore or a synthetic rutile ore. It is impossible to completely remove such a sulfate and chloride from the titanium tetrachloride solution by centrifugal separation or rectification. Especially, there remains vanadium oxychloride, which has a boiling point approximate to that of titanium tetrachloride.

These sulfate and chloride contained in the titanium tetrachloride solution are firmly bonded in the insides or the surfaces of the titanium oxide particles by a crystallization stabilizer and a sintering preventive agent which are added before the oxidization step and which are crosslinking the titanium oxide particles, so that the agglomeration between the titanium oxide particles is further increased.

It is considered that although soluble sodium salt and soluble sulfate are firmly bonded in the insides or the surfaces of the crude titanium oxide particles by means of a sintering preventive agent or a regulator, as described above, when the crude titanium oxide particles are pulverized by a wet-process so as to loosen the coarse particles, the pH value of the resultant slurry is adjusted to not less than 13 and the slurry is heat-treated at a temperature of not lower then 80° C., the aqueous alkaline solution sufficiently permeates into the titanium oxide particles, and as a result, the binding power of the sintering preventive agent, rutile crystallization stabilizer, the seed for accelerating the transfer to a rutile, etc., which are firmly bonded with the surfaces and the insides of the particles and the insides of the agglomerates, become gradually weak, and they are dissociated from the insides or the surfaces of the particles or the insides of the agglomerates. At the same time, the water-soluble sodium salt, the water-soluble sulfate and further, the water-soluble chloride are also easily removed by washing the particles with water.

It is considered that a deterioration in the magnetic iron-based metal particles which are dispersed in the magnetic recording layer is suppressed, because the content of water-soluble ingredients such as the soluble sodium salt and the soluble sulfate which accelerate the corrosion of a metal, is small in the titanium oxide particles and also because the pH value of the titanium oxide particles themselves is as high as not less than 8.

Actually, it is confirmed that a progress of corrosion of magnetic iron-based metal particles is suppressed by a synergistic effect of a small content of water-soluble ingredients and a pH value of not less than 8, from the fact that the above-mentioned advantages are not attained in any of the bases of (1) heat-treating the titanium oxide particles after wet pulverization in an aqueous alkali solution having a pH value of less than 13 at a temperature of not lower than 80° C., (2) heat-treating the titanium oxide particles after wet pulverization in an aqueous alkali solution having a pH value of not less than 13 at a temperature of lower than 80° C., or (3) heat-treating the titanium oxide particles containing coarse particles without being pulverized by a wet process in an aqueous alkali solution having a pH value of not less than 13 at a temperature of not lower than 80° C., as shown in later-described examples and comparative examples.

In the titanium oxide particles for a non-magnetic undercoat layer according to the present invention, since it is possible to sufficiently remove the soluble sodium salt and the soluble sulfate, which agglomerate the titanium oxide particles by firming crosslinking, by washing the particles with water, as shown in later-described examples, the agglomerates are loosened into substantially discrete particles. Consequently, the titanium oxide particles have an excellent dispersion in the binder resin, so that it is possible to produce a non-magnetic undercoat layer having a smooth surface. That is, the titanium oxide particles of the present invention are suitable as non-magnetic particles for a non-magnetic undercoat layer of a magnetic recording medium.

The magnetic recording medium according to the present invention is produced from the above-described titanium oxide particles as the non-magnetic particles for a non-magnetic undercoat layer. The substrate, therefore, has a uniform thin layer having a smooth surface. In addition, owing to a small content of soluble sodium sulfate and soluble sulfate in the titanium oxide particles and a pH value of not less than 8, it is possible to suppress a deterioration in the magnetic characteristics caused by the corrosion of the magnetic iron-based metal particles in the magnetic recording layer, so that it is possible to maintain the properties as a magnetic recording medium for a long period.

The reason why the durability of the magnetic recording medium is enhanced is not obvious yet, but it is considered to be because the use of magnetic iron-based metal particles containing aluminum as the magnetic particles enhances the adsorption strength of the magnetic iron-based metal particles to the binder resin in the vehicle, so that the synergistic effect of the firm retaintion of the magnetic particles held in the magnetic recording layer and the enhanced degree of adhesion of the magnetic recording layer itself to the non-magnetic undercoat layer is produced.

EXAMPLES

The present invention will now be described in more detail with reference to the following examples and comparative examples, but the present invention is not restricted to those examples and various modifications are possible within the scope of the invention.

(1) The residue on sieve was obtained by measuring the concentration of the slurry after pulverization by a wet-process in advance, and determining the quantity of the solid content on the sieve remaining after the slurry equivalent to the 100 g of the solid content was passed through the sieve of 325 meshes (mesh size: 44 µm).

(2) The average particle diameter of the granular titanium oxide particles, and the average major axial diameter and the average minor axial diameter of the acicular or rice-ball shaped titanium oxide particles are expressed by the average values of 350 particles measured in the photography obtained by magnifying an electron micrograph (×30000) at 4 times in the vertical and horizontal directions, respectively.

The aspect ratio is the ratio of the average major axial diameter and the average minor axial diameter.

(3) The specific surface area is expressed by the value measured by a MET method.

(4) The contents of soluble sodium salt and soluble sulfate were obtained by measuring the Na content and $SO_4^{2-}$ content in the filtrate obtained by filtering the supernatant liquid produced for the measurement of pH value which will be described later, through filter paper No. 5C, by using an Inductively Coupled Plasma Emission Spectrophotometer SPS 4000 (manufactured by Seiko Instruments and Electronics, Ltd.).

(5) The content of soluble chloride was obtained by measuring the $Cl^-$ content in the same filtrate as in the above-mentioned (4) by nephelometry method.

(6) the pH value of the particles was measured in the following. 5 g of the sample was weighted into a 300-ml triangle flask, and 100 ml of pure water was added thereto. The suspension was heated and boiled for about 5 minutes, and then it was corked and left to cool to an ordinary temperature. After adding pure water which was equivalent to the pure water lost by boiling, the flask was corked again, shaken for 1 minute, and left to stand for 5 minutes. The pH value of the supernatant obtained was measured in accordance JIS Z 8802-7.

(7) The Al content and the $SiO_2$ content existent in the titanium oxide particles were measured from fluorescent X-ray analysis.

(8) The geometrical standard deviation ($\sigma_g$) of the particle diameter of the granular titanium oxide particles, or the major axial diameter of the acicular or rice-ball shaped titanium oxide particles was obtained in the following manner. The particle diameters or major axial diameters were measured from the enlarged photograph in the above-mentioned (2), and the actual particle diameters or major axial diameters and the number of particles were calculated on the basis of the measured values. On logarithmico-normal probability paper, the particle diameters or major axial diameters were plotted at regulator intervals on the abscissa-axis and the accumulative number of particles belonging to each interval of the particle diameters or major axial diameters was plotted by percentage on the ordinate-axis by a statistical technique. The particle diameters or major axial diameters corresponding to the number of particles of 50% and 84.13%, respectively, were read from the graph, and the geometrical standard deviation ($\sigma_g$) was measured from the following formula:

Geometrical standard deviation (σg) = {Particle
diameter or major axial diameter (μm)
(geometrical average diameter) -
corresponding to the number of particles
of 84.13% under integration
sieve}/{Particle diameter or major axial
diameter (μm) (geometrical average
diameter) corresponding to the number of
particles of 50% under integration sieve}

The smaller the geometrical standard deviation, the more excellent the particle size distribution of the major axial diameters of the particles.

(9) The degree of denseness of the titanium oxide particles is represented by $S_{BET}/S_{TEM}$ as described above.

$S_{BET}$ represents a specific surface area measured by the above-described BET method. When the particles are granular, $S_{TEM}$ represents a value calculated from the average particle diameter d cm measured from the electron microphotograph described in the above-mentioned (2) on the assumption that the particles are spherical in accordance with the following formula:

$$S_{TEM}(m^2/g) = \{6/(d \times \rho_p)\} \times 10^{-4}$$

wherein $\rho_p$ represents a true specific gravity of the titanium oxide particles, and 3.4 g/cm³ was used.

When the shape of the particles were acicular or rice-ball shaped, $S_{TEM}$ was calculated from the average major axial diameter (φcm) and the average minor axial diameter (w cm) measured from the electron microphotograph described in the above-mentioned (2) on the assumption that a particle is a rectangular parallelepiped in accordance with the following formula:

$$S_{TEM}(m^2/g) = \{(2 \times w + 4 \times \phi)/(w \times \phi \times \rho_p)\} \times 10^{-4}$$

$\rho_p$ represents the true specific gravity of the titanium oxide particles, and 3.4 g/cm³ was used.

Since $S_{TEM}$ is a specific surface area of a particle having a smooth surface without any dehydration pore within or on the surface thereof, the closer $S_{BET}/S_{TEM}$ of particles is to 1, it means, the smoother surface the titanium oxide particles have without any dehydration pore within or on the surface thereof, in order words, the particles are high-density particles

(10) The viscosity of the coating composition was obtained by measuring the viscosity of the coating composition at 25° C. at a shear rate D of 1.92 sec⁻¹ by using an E-type viscometer (cone plate type viscometer) EMD-R (manufactured by Tokyo Keiki, Co., Ltd.). When the particle diameter of the titanium oxide particles are about the same, the smaller the viscosity of the coating composition, the more excellent the dispersibility of the titanium oxide particles.

(11) The gloss of the surface of the coating film of the non-magnetic undercoat layer or the magnetic recording layer was measured at 45° by "Glossmeter UGV-5D" (manufactured by Suga Shikenki, Co., Ltd.). The higher the gloss, the more excellent the dispersibility of the titanium oxide particles.

(12) The surface roughness Ra of the coating film surface of the non-magnetic undercoat layer or the magnetic recording layer was obtained by measuring the center-line average roughness of the coating film by using "Surfcom-575A" (manufactured by Tokyo Seimitsu Co., Ltd.). The lower the value Ra, the more excellent the dispersibility of the titanium oxide particles.

(13) The strength of the coating film was obtained by measuring the Young's modulus of the coating film by using "Autograph" (manufactured by Shimazu Seisakusho, Ltd.). The Young's modulus is represented by the relative value with that of a commercially available video tape "AV T-120 (produced by Victor Company of Japan, Limited)". The higher the relative value, the higher the strength of the coating film.

(14) The thickness of each of non-magnetic base film, the non-magnetic undercoat layer and the magnetic recording layer constituting the magnetic recording medium was measured in the following manner by using a Digital Electronic Micrometer K351C (manufactured by Anritsu Corp.).

The thickness (A) of a non-magnetic base film was first measured. Similarly, the thickness (B=the sum of the thicknesses of the non-magnetic base film and the non-magnetic undercoat layer) of a substrate obtained by forming a non-magnetic undercoat layer on the non-magnetic base film was measured. Furthermore, the thickness (C=the sun of the thickness of the non-magnetic base film, the non-magnetic undercoat layer and the magnetic recording layer) of a magnetic recording medium obtained by forming a magnetic recording layer on the non-magnetic undercoat layer was measured. The thickness of the non-magnetic undercoat layer is expressed by B–A, and the thickness of the magnetic recording layer is expressed by C–B.

(15) The magnetic characteristics of the magnetic iron-based metal particles and the magnetic recording medium were measured under an external magnetic field of 10 kOe by "Vibration Sample Magnetometer VSM-3S-15 (manufactured by Toei Kogyo, Co., Ltd)".

(16) The resin adsorptivity of the magnetic iron-based metal particles represents the degree at which a resin is adsorbed to the particles. The closer to 100 the value obtained in the following manner, the stronger the resin is adsorbed to the particles.

The resin adsorption Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer resin having a sodium sulfonate group dissolved therein were charged into a 100-ml polyethylene bottle together with 120 g of 3 mmφ steel beads. The particles and the solvent were mixed and dispersed by a paint shaker for 60 minutes.

Thereafter, 50 g of the resultant coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method as the resin adsorption Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The resultant mixture was subjected to ultrasonic dispersion for 15 minutes, and the thus-obtained suspension was charged into a 50-ml settling cylinder. The solid content was separated from the solvent portion by the centrifugalization them at a rate of 10000 rpm for 15 minutes. The concentration of the solid resin content contained in the solvent portion was measured so as to determine the resin content extracted from the resin which had been adsorbed to the particle surfaces into the solvent phase.

Further, the process from the step of taking the solid content into the 100 ml-tall beaker to the step of determining of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=\{(Wa-We)/Wa\}\times 100.$$

The higher T value, the firmer the resin adsorption to the particles surfaces in the vehicle and the more favorable.

(17) The change in the magnetic characteristics with passage of time of a magnetic recording medium caused by the corrosion of the magnetic iron-based metal particles was examined as follows.

The magnetic recording medium was allowed to stand in an environment of a temperature of 60° C. and a relative humidity of 90% for 14 days, and the coercive force and the saturation magnetic flux density were measured before and after standing. A change in each characteristic was divided by-the value before standing, and represented by percentage.

(18) The light transmittance of a magnetic sheet is expressed by the linear adsorption coefficient measured by using "Photoelectric Spectrophotometer UV-2100" (manufactured by Shimazu Seisakusho, Ltd.), The linear adsorption coefficient is defined by the following formula:

$$\text{Linear adsorption coefficient } (\mu m^{-1})=\{1n(1/t)\}/FT$$

wherein t represents light transmittance (−) at λ=900 nm, and FT represents thickness (μm) of the coating film composition of the film used for the measurement.

The larger the value, the more difficult it is for the magnetic sheet to transit light.

As a blank for measuring the linear adsorption coefficient, the same non-magnetic base film as that of the above-mentioned magnetic sheet, was used.

(19) The durability of a magnetic recording medium was represented by the running durability and the scratch resistance.

(i) The running durability was evaluated by the actual operating time under the conditions that the load was 200 gw and the relative speed of the head and the tape was 16 m/s by using "Media Durability Tester MDT-3000" (manufactured by Steinberg Associates Corp.). the longer the actual operating time, the higher the running durability.

(ii) The Scratch resistance was observed through a microscope and the degree of scratching was visually judged.

Evaluation was the following four ranks.

A: No scratch

B: A few scratches

C: Many scratches

D: A great many scratches

Example 1

Pulverization of titanium oxide particles by a wet process 750 g of commercially available titanium oxide particles (A) (crystal type: rutile, particle shape: granular, average particle diameter 0.055 μm, BET specific surface area 73.4 m²/g, the content of soluble sodium salt: 560 ppm (calculated as Na), the content of soluble sulfate: 262 ppm (calculated as $SO_4$), soluble chloride: 186 ppm (calculated as Cl), pH value: 7.2, geometrical standard deviation: 1.51) obtained by a sulfuric acid method were roughly pulverized by a Nara mill in advance. Thereafter, the pulverized particles were charged into 5.0 liter of pure water and peptized by a homomixer (manufactured by Tokushu-kika Kogyo, Co., Ltd) for 60 minutes.

The slurry of the titanium oxide particles obtained was then mixed and dispersed at an axial rotation frequency of 2000 rpm while being circulated by a horizontal Sand Grinder Mill (Dispermat SL, manufactured by SC•Addichem, Co., Ltd). The titanium oxide particles in the slurry remaining on a sieve of 325 meshes (mesh size: 44 μm) was 0 wt %.

The concentration of the titanium oxide particles in the obtained slurry was adjusted to 100 g/liter, and 6N-aqueous NaOH solution was added to 7 liter of the slurry under stirring so as to adjust the pH value to 13.5. The slurry was then heated to 95° C. under stirring, and was held for 180 minutes at 95° C.

The slurry was then washed with water by a decantation method and the pH value of the slurry was adjusted to 10.6. The concentration of the slurry at this point was 89 g/liter.

The obtained particles were filtered out through a Buchner filter, and the pure water was passed into the filtrate until the electric conductivity of the filtrate became not more than 20 μs. The particles were then dried by an ordinary method and pulverized to as to obtain the target titanium oxide particles.

The titanium oxide particles obtained had an average particle diameter of 0.052 μm and a BET specific surface area ($S_{BET}$) of 73.5 m²/g. The content of soluble sodium salt was 137 ppm (calculated as Na), the content of soluble sulfate was 43 ppm (calculated as $SO_4$), and the content of soluble chloride was 10 ppm (calculated as Cl). The pH value of the particles was 8.9, the geometric standard deviation $\sigma_g$ of particle size was 1.35, and the degree of denseness ($S_{BET}/S_{TEM}$) was 2.01.

Example 2

Production of a non-magnetic undercoat layer 12 g of the titanium oxide particles (A) described above, a binder resin solution (30 wt % of a vinyl chloride-vinyl acetate copolymer resin having a sodium sulfonate group and 70 wt % of cyclohexanone) and cyclohexanone were mixed. The mixture (solid content: 72%) obtained was kneaded by a plast mill for 30 minutes.

The kneaded material was taken out, charged into a 140-ml glass bottle together with 95 g of 1.5 mmφ glass beads, a binder resin solution (30 wt % of a polyurethane resin having a sodium sulfonate group and 70 wt % of a solvent (methyl ethyl ketone:toluene=1:1)), cyclohexanone, methyl ethyl ketone and toluene. The resultant mixture was mixed and dispersed by a paint shaker for 6 hours to obtain a coating composition.

The composition of the thus-obtained coating composition containing the titanium oxide particles was as follows:

| | | |
|---|---|---|
| Titanium oxide particles | 100 | parts by weight |
| Vinyl chloride-vinyl acetate copolymer resin having a sodium sulfonate group | 10 | parts by weight |
| Polyurethane resin having a sodium sulfonate group | 10 | parts by weight |
| Cyclohexanone | 44.6 | parts by weight |
| Methyl ethyl ketone | 111.4 | parts by weight |
| Toluene | 66.9 | parts by weight |

The thus-obtained coating composition containing the titanium oxide particles was applied on a polyethylene terephthalate film of 12 μm in thickness to a thickness of 55

μm by an applicator, and the film was then dried, thereby forming a non-magnetic undercoat layer. The thickness of the non-magnetic undercoat layer was 3.5 μm, and the thickness of the substrate was 15.5 μm.

The gloss of the non-magnetic undercoat layer was 170%, the surface roughness Ra was 9.2 nm, and the Young's modulus (relative value) was 113.

Example 3
Production of a magnetic recording layer 12 g of acicular magnetic iron-based metal particles (a) (Co content: 5.61 wt %, Al abundance: 1.75 wt % (inside portion: 1.71 wt %, surface layer portion: 0.03 wt %, surface coat: 0.01 wt %), average major axial diameter: 0.120 μm, average minor axial diameter: 0.0190 μm, aspect ratio: 6.3:1, coercive force: 1840 Oe, saturation magnetization: 130 emu/g), 1.2 g of a polishing agent (trade name: AKP-30, produced by Sumitomo Chemical Co., Ltd.), 0.36 g of carbon black (trade name: 3250B, produced by Mitsubishi Chemical Corporation), a binder resin solution (30 wt % of a vinyl chloride-vinyl acetate copolymer resin having a sodium sulfonate group and 70 wt % of cyclohexanone) and cyclohexanone were mixed. The mixture (solid content: 78 wt %) obtained was kneaded by a blast mill for 30 minutes.

The kneaded material was taken out, charged into a 140-ml glass bottle together with 95 g of 1.5 mmφ glass beads, a binder resin solution (30 wt % of a polyurethane resin having a sodium sulfonate group and 70 wt % of a solvent (methyl ethyl ketone:toluene=1:1)), cyclohexanone, methyl ethyl ketone and toluene. The resultant mixture was mixed and dispersed by a paint shaker for 6 hours to obtain a magnetic coating composition. Thereafter, a lubricant and a hardening agent were added to the magnetic coating composition and the mixture was mixed and dispersed by a paint shaker for 15 minutes.

The composition of the thus-obtained coating composition containing the titanium oxide particles was as follows:

| | | |
|---|---|---|
| Magnetic iron-based alloy particles | 100 | parts by weight |
| Vinyl chloride-vinyl acetate copolymer resin having a sodium sulfonate group | 10 | parts by weight |
| Polyurethane resin having a sodium sulfonate group | 10 | parts by weight |
| Polishing agent (AKP-30) | 10 | parts by weight |
| Carbon black (#3250B) | 3.0 | parts by weight |
| Lubricant (myristic acid: n-butyl stearate = 1:2) | 3.0 | parts by weight |
| Hardening agent (polyisocyanate) | 5.0 | parts by weight |
| Cyclohexanone | 65.8 | parts by weight |
| Methyl ethyl ketone | 164.5 | parts by weight |
| Toluene | 98.7 | parts by weight |

The thus-obtained magnetic coating composition was applied on the substrate having the non-magnetic undercoat layer to a thickness of 15 μm by an applicator, and the magnetic recording medium obtained was oriented and dried in a magnetic field, and then calendered. The magnetic recording medium was then subjected to a curing reaction at a temperature of 60° C. for 24 hours, and thereafter slit into a width of 0.5 inch, thereby obtaining a magnetic tape. The thickness of the magnetic recording layer was 1.1 μm, and the total thickness of the magnetic tape was 16.6 μm.

The coercive force Hc of the magnetic tape obtained was 1890 Oe, the squareness was 0.86, the gloss was 215%, the surface roughness Ra was 9.6 nm, the Young's modulus (relative value) was 119, and the linear absorption coefficient was 1.22. Changes in the coercive force Hc and the saturation magnetic flux density Bm with passage of time were 7.0%, and 8.5%, respectively. The running durability was 22.8 minutes and the scratch resistance was "A".

Examples 4 to 10, Comparative Examples 1 to 3
Treatment of titanium oxide particles in an aqueous alkali solution Titanium oxide particles (B) to (H) shown Table 1 were prepared.

titanium oxide particles treated with an alkali were obtained in the same procedure as defined in Example 1 except for varying the kind of titanium oxide particles, whether or not the wet pulverization process was included, the pH value of the slurry, the heating time and temperature in the heat-treatment in an aqueous alkali solution.

the main treating conditions and various properties are shown in Table 2.

Example 11
Surface coating of titanium oxide particles

The pH value of the slurry was adjusted to 10.5 by washing with water by a decantation method in the same procedure as defined in Example 1. The concentration of the slurry was 89 g/liter. 5 liter of the slurry was reheated to 60° C., and 824 ml (equivalent to 5.0 wt % (calculated as Al) based on the titanium oxide particles) of a 1.0-N $NaAlO_2$ solution was added to the slurry, and the mixture was held for 60 minutes. Thereafter, the pH value of the resultant mixture was adjusted to 8.0 by using acetic acid.

The particles were then filtered out, washed with water, dried and pulverized in the same procedure as defined in Example 1, thereby obtaining titanium oxide particles coated with an hydroxide of Al.

The titanium oxide particles obtained had an average particle diameter of 0.052 μm and a BET specific surface area ($S_{BET}$) of 75.6 $m^2$/g. The content of soluble sodium salt was 116 ppm (calculated as Na), the content of soluble sulfate was 20 ppm (calculated as $SO_4$), and the content of soluble chloride was 0 ppm (calculated as Cl). The pH value of the particles was 8.9, the geometric standard deviation $\sigma_g$ of particle size was 1.35, and the degree of denseness ($S_{BET}/S_{TEM}$) was 2.23.

Examples 12 to 18 titanium oxide particles were obtained in the same procedure as defined in Example 11 except for varying the kind of titanium oxide particles, an the kind and the amount of surface treating material and the adjusted pH value of the slurry.

The main producing conditions and various properties are shown in Table 3.

Examples 19 to 33, Comparative Examples 5 to 16
Production of a non-magnetic undercoat layer A non-magnetic undercoat layer was obtained in the same procedure as defined in Example 2 except for varying the kind of titanium oxide particles.

The main producing conditions and various properties are shown in Tables 4 and 5.

Examples 34 to 69, Comparative Examples 17 to 30
Production of a magnetic recording medium using magnetic iron-based alloy particles A magnetic recording medium using magnetic iron-based metal particles was obtained in the same procedure as defined in Example 3 except for varying the kind of non-magnetic undercoat layer and the kind of magnetic iron-based metal particles.

The kind and various properties of magnetic iron-based metal particles, the main producing conditions for the magnetic recording medium and various properties of the magnetic recording medium are shown in Tables 6 to 9.

TABLE 1

| Particles as a starting material | Titanium oxide particles (A) | Titanium oxide particles (B) | Titanium oxide particles (C) | Titanium oxide particles (D) |
|---|---|---|---|---|
| Production method | Sulfuric acid method | Sulfuric acid method | Sulfuric acid method | Sulfuric acid method |
| Crystal type | Rutile | Rutile | Rutile | Rutile |
| Particle shape | Granular | Granular | Granular | Granular |
| Properties of titanium oxide particles | | | | |
| Average particle diameter | | | | |
| •Particle diameter or major axial diameter ($\mu m$) | 0.055 | 0.092 | 0.141 | 0.173 |
| •Minor axial diameter ($\mu m$) | — | — | — | — |
| •Aspect ratio | — | — | — | — |
| Geometric standard deviation $\sigma g$ | 1.51 | 1.56 | 1.53 | 1.56 |
| Specific surface area ($m^2/g$) | 73.4 | 38.8 | 29.4 | 22.8 |
| Soluble Na salt (ppm) | 560 | 425 | 356 | 398 |
| Soluble sulfate (ppm) | 262 | 326 | 276 | 359 |
| Soluble chloride (ppm) | 186 | 200 | 176 | 153 |
| pH value of particles | 7.2 | 7.0 | 7.0 | 7.2 |

| Particles as a starting material | Titanium oxide particles (E) | Titanium oxide particles (F) | Titanium oxide particles (G) | Titanium oxide particles (H) |
|---|---|---|---|---|
| Production method | Sulfuric acid method | Chlorine method | Sulfuric acid method | Sulfuric acid method |
| Crystal type | Rutile | Rutile | Anatase | Rutile |
| Particle shape | Granular | Granular | Granular | Acicular |
| Properties of titanium oxide particles | | | | |
| Average particle diameter | | | | |
| •Particle diameter or major axial diameter ($\mu m$) | 0.096 | 0.126 | 0.064 | 0.291 |
| •Minor axial diameter ($\mu m$) | — | — | — | 0.068 |

TABLE 1-continued

| | | | | |
|---|---|---|---|---|
| •Aspect ratio | — | — | — | 4.3:1 |
| Geometric standard deviation $\sigma g$ | 1.74 | 1.63 | 1.52 | 1.60 |
| Specific surface area ($m^2/g$) | 41.0 | 25.5 | 56.6 | 44.5 |
| Soluble Na salt (ppm) | 1,983 | 563 | 318 | 2,165 |
| Soluble sulfate (ppm) | 3,652 | 164 | 1,489 | 1,862 |
| Soluble chloride (ppm) | 156 | 462 | 178 | 208 |
| pH value of particles | 5.8 | 7.5 | 6.4 | 7.8 |

TABLE 2

| Examples No. | Ex. 1 | Ex. 4 | Ex. 5 | Ex. 6 | Ex. 7 | Ex. 8 |
|---|---|---|---|---|---|---|
| Kind of particles as a starting material | (A) | (B) | (C) | (D) | (E) | (F) |
| Wet pulverization | | | | | | |
| Yes or No | Yes | Yes | Yes | Yes | Yes | Yes |
| Residue on sieve (wt %) | 0 | 0 | 0 | 0 | 0 | 0 |
| Adjustment of pH | | | | | | |
| pH value | 13.5 | 13.1 | 13.3 | 13.5 | 13.8 | 13.5 |
| Heat-treatment in aqueous alkali solution | | | | | | |
| Temperature (° C.) | 95 | 85 | 83 | 95 | 98 | 100 |
| Time (min) | 180 | 120 | 120 | 90 | 180 | 95 |
| Properties of titanium oxide particles treated with aqueous alkali solution | | | | | | |
| Average major axial diameter ($\mu m$) | 0.052 | 0.088 | 0.134 | 0.169 | 0.092 | 0.125 |
| Geometric standard deviation $\sigma g$ | 1.35 | 1.36 | 1.33 | 1.36 | 1.43 | 1.48 |
| Average minor axial diameter | — | — | — | — | — | — |
| Aspect ratio | — | — | — | — | — | — |
| $S_{BET}$ ($m^2/g$) | 73.5 | 39.0 | 29.5 | 22.9 | 40.8 | 25.0 |
| $S_{TEM}$ ($m^2/g$) | 33.9 | 20.1 | 13.2 | 10.4 | 19.2 | 14.1 |
| $S_{BET}/S_{TEM}$ | 2.17 | 1.94 | 2.24 | 2.19 | 2.13 | 1.77 |
| Soluble Na salt (ppm) | 137 | 128 | 144 | 111 | 56 | 136 |
| Soluble sulfate (ppm) | 43 | 56 | 38 | 20 | 16 | 69 |
| Soluble chloride (ppm) | 10 | 5 | 10 | 15 | 0 | 10 |
| pH value of particles | 8.9 | 9.1 | 9.3 | 9.0 | 8.8 | 9.2 |

| Examples No. | Ex. 9 | Ex. 10 | Comp. Ex. 1 | Comp. Ex. 2 | Comp. Ex. 3 |
|---|---|---|---|---|---|
| Kind of particles as a starting material | (G) | (H) | (E) | (E) | (E) |

TABLE 2-continued

| Wet pulverization | | | | | |
|---|---|---|---|---|---|
| Yes or No | Yes | Yes | Yes | Yes | No |
| Residue on sieve (wt %) | 0 | 0 | 0 | 0 | 26.5 |
| Adjustment of pH | | | | | |
| pH value | 13.4 | 13.5 | 11.5 | 13.3 | 13.1 |
| Heat-treatment in aqueous alkali solution | | | | | |
| Temperature (° C.) | 90 | 95 | 85 | 40 | 80 |
| Time (min) | 90 | 95 | 85 | 40 | 80 |
| Properties of titanium oxide particles treated with aqueous alkali solution | | | | | |
| Average major axial diameter (μm) | 0.061 | 0.289 | 0.092 | 0.092 | 0.095 |
| Geometric standard deviation σg | 1.32 | 1.48 | 1.45 | 1.44 | 1.68 |
| Average minor axial diameter (μm) | — | 0.06 | — | — | — |
| Aspect ratio | — | 4.5:1 | — | — | — |
| $S_{BET}$ (m$^2$/g) | 57.0 | 43.8 | 42.1 | 42.0 | 41.5 |
| $S_{TEM}$ (m$^2$/g) | 28.9 | 20.4 | 19.2 | 19.2 | 18.6 |
| $S_{BET}/S_{TEM}$ | 1.97 | 2.15 | 2.19 | 2.19 | 2.23 |
| Soluble Na salt (ppm) | 91 | 96 | 390 | 365 | 392 |
| Soluble sulfate (ppm) | 9 | 16 | 381 | 251 | 168 |
| Soluble chloride (ppm) | 25 | 0 | 70 | 56 | 20 |
| pH of particles | 9.0 | 9.3 | 6.8 | 7.3 | 7.4 |

TABLE 3

| Examples | Ex. 11 | Ex. 12 | Ex. 13 | Ex. 14 |
|---|---|---|---|---|
| Kind of titanium oxide particles treated with aqueous alkali solution | Example 1 | Example 4 | Example 5 | Example 6 |
| Surface treatment | | | | |
| Kind | Sodium aluminate | Water glass #3 | Aluminum sulfate | Colloidal silica |
| Amount added calculated as element (wt %) | 5.0 | 1.0 | 3.0 | 5.0 |
| Coating compound | | | | |
| Kind | Hydroxide of Al | SiO$_2$ | Hydroxide of Al | SiO$_2$ |
| Amount (wt %) | 4.71 | 0.96 | 2.93 | 4.21 |
| pH adjusted to | 8.0 | 8.2 | 8.5 | 8.0 |
| Properties of titanium oxide particles treated with aqueous alkali solution | | | | |
| Average major axial diameter (μm) | 0.052 | 0.089 | 0.134 | 0.169 |
| Geometric standard deviation σg | 1.35 | 1.37 | 1.34 | 1.36 |
| Average minor axial diameter (μm) | — | — | — | — |
| Aspect ratio | — | — | — | — |
| $S_{BET}$ (m$^2$/g) | 75.6 | 39.2 | 28.8 | 23.8 |
| $S_{TEM}$ (m$^2$/g) | 33.9 | 19.8 | 13.2 | 10.4 |
| $S_{BET}/S_{TEM}$ | 2.23 | 1.93 | 2.19 | 2.28 |
| Soluble Na salt (ppm) | 116 | 118 | 106 | 89 |
| Soluble sulfate (ppm) | 20 | 40 | 31 | 21 |
| Soluble chloride (ppm) | 0 | 0 | 0 | 0 |
| pH value of particles | 8.9 | 9.3 | 9.6 | 9.1 |

| Examples | Ex. 15 | | Ex. 16 | |
|---|---|---|---|---|
| Kind of titanium oxide particles treated with aqueous alkali solution | Example 7 | | Example 8 | |
| Surface treatment | | | | |
| Kind | Sodium aluminate | Water glass #3 | Aluminum sulfate | Water glass #3 |
| Amount added calculated as element (wt %) | 3.0 | 1.0 | 0.5 | 3.0 |
| Coating compound | | | | |
| Kind | Hydroxide of Al | SiO$_2$ | Hydroxide of Al | SiO$_2$ |
| Amount (wt %) | 2.88 | 0.91 | 0.48 | 2.86 |
| pH adjusted to | 8.0 | | 8.5 | |
| Properties of titanium oxide particles treated with aqueous alkali solution | | | | |
| Average major axial diameter (μm) | 0.092 | | 0.124 | |
| Geometric standard deviation σg | 1.43 | | 1.47 | |
| Average minor axial diameter (μm) | — | | — | |
| Aspect ratio | — | | — | |
| $S_{BET}$ (m$^2$/g) | 40.8 | | 25.1 | |
| $S_{TEM}$ (m$^2$/g) | 19.2 | | 14.2 | |
| $S_{BET}/S_{TEM}$ | 2.13 | | 1.76 | |
| Soluble Na salt (ppm) | 43 | | 130 | |
| Soluble sulfate (ppm) | 8 | | 63 | |
| Soluble chloride (ppm) | 0 | | 0 | |
| pH value of particles | 9.0 | | 9.3 | |

| Examples | Ex. 17 | | Ex. 18 | Comp. Ex. 4 |
|---|---|---|---|---|
| Kind of titanium oxide particles treated with aqueous alkali solution | Example 9 | | Example 10 | titanium oxide particles (E) |
| Surface treatment | | | | |
| Kind | Sodium aluminate | Water glass #3 | Sodium aluminate | Aluminum sulfate |
| Amount added calculated as | 10.0 | 3.0 | 1.5 | 2.0 |

TABLE 3-continued

| element (wt %) Coating compound | | | | |
|---|---|---|---|---|
| Kind | Hydroxide of Al | SiO₂ | Hydroxide of Al | Hydroxide of Al |
| Amount (wt %) | 8.91 | 2.86 | 1.48 | 1.88 |
| pH adjusted to | | 7.8 | 8.0 | 8.0 |
| Properties of titanium oxide particles treated with aqueous alkali solution | | | | |
| Average major axial diameter (μm) | | 0.062 | 0.290 | 0.092 |
| Geometric standard deviation σg | | 1.32 | 1.48 | 1.44 |
| Average minor axial diameter (μm) | | — | 0.064 | — |
| Aspect ratio | | — | 4.5:1 | — |
| $S_{BET}$ (m²/g) | | 60.1 | 43.7 | 40.8 |
| $S_{TEM}$ (m²/g) | | 28.5 | 20.4 | 19.2 |
| $S_{BET}/S_{TEM}$ | | 2.11 | 2.14 | 2.13 |
| Soluble Na salt (ppm) | | 87 | 51 | 513 |
| Soluble sulfate (ppm) | | 11 | 12 | 396 |
| Soluble chloride (ppm) | | 15 | 0 | 86 |
| pH value of particles | | 9.0 | 9.1 | 7.8 |

TABLE 4

| Examples | Ex. 2 | Ex. 19 | Ex. 20 | Ex. 21 | Ex. 22 | Ex. 23 |
|---|---|---|---|---|---|---|
| Production of non-magnetic coating | | | | | | |
| Kind of titanium oxide particles | Ex. 1 | Ex. 4 | Ex. 5 | Ex. 6 | Ex. 7 | Ex. 8 |
| Weight ratio of particles and resin | 5.0 | 5.0 | 5.0 | 5.0 | 5.0 | 5.0 |
| Non-magnetic coating Viscosity (cP) | 1,280 | 1,024 | 512 | 256 | 896 | 563 |
| Non-magnetic undercoat layer | | | | | | |
| Thickness (μm) | 3.5 | 2.9 | 3.0 | 2.6 | 2.7 | 2.8 |
| Gloss (%) | 170 | 168 | 152 | 146 | 163 | 153 |
| Surface roughness (nm) | 9.2 | 10.0 | 12.2 | 13.8 | 11.1 | 12.4 |
| Young's modulus (Relative value | 113 | 112 | 116 | 121 | 108 | 116 |

| Examples | Ex. 24 | Ex. 25 | Ex. 26 | Ex. 27 | Ex. 28 |
|---|---|---|---|---|---|
| Production of non-magnetic coating | | | | | |
| Kind of titanium oxide particles | Ex. 9 | Ex. 10 | Ex. 11 | Ex. 12 | Ex. 13 |
| Weight ratio of particles and resin | 5.0 | 5.0 | 5.0 | 5.0 | 5.0 |
| Non-magnetic coating Viscosity (cP) | 1,536 | 333 | 1,892 | 896 | 235 |
| Non-magnetic undercoat layer | | | | | |
| Thickness (μm) | 3.0 | 2.8 | 3.0 | 2.8 | 2.9 |
| Gloss (%) | 170 | 141 | 196 | 172 | 156 |
| Surface roughness (nm) | 9.3 | 14.4 | 7.0 | 8.6 | 11.8 |
| Young's modulus (Relative value | 107 | 126 | 115 | 116 | 120 |

| Examples | Ex. 29 | Ex. 30 | Ex. 31 | Ex. 32 | Ex. 33 |
|---|---|---|---|---|---|
| Production of non-magnetic coating | | | | | |
| Kind of titanium oxide particles | Ex. 14 | Ex. 15 | Ex. 16 | Ex. 17 | Ex. 18 |
| Weight ratio of particles and resin | 5.0 | 5.0 | 5.0 | 5.0 | 5.0 |
| Non-magnetic coating Viscosity (cP) | 154 | 768 | 410 | 1,280 | 204 |
| Non-magnetic undercoat layer | | | | | |
| Thickness (μm) | 3.1 | 2.6 | 2.6 | 3.0 | 2.6 |
| Gloss (%) | 146 | 166 | 158 | 175 | 147 |
| Surface roughness (nm) | 13.0 | 9.8 | 10.8 | 8.2 | 13.7 |
| Young's modulus (Relative value) | 126 | 116 | 122 | 112 | 130 |

TABLE 5

| Examples | Comp. Ex. 5 | Comp. Ex. 6 | Comp. Ex. 7 | Comp. Ex. 8 |
|---|---|---|---|---|
| Production of non-magnetic coating | | | | |
| Kind of titanium oxide particles | Titanium oxide particles (A) | Titanium oxide particles (B) | Titanium oxide particles (C) | Titanium oxide particles (D) |
| Weight ratio of particles and resin | 5.0 | 5.0 | 5.0 | 5.0 |
| Non-magnetic coating Viscosity (cP) | 5,120 | 2,560 | 896 | 333 |
| Non-magnetic undercoat layer | | | | |
| Thickness (μm) | 3.1 | 3.2 | 3.0 | 3.2 |
| Gloss (%) | 138 | 121 | 111 | 96 |
| Surface roughness (nm) | 15.2 | 18.8 | 21.6 | 46.3 |

TABLE 5-continued

| | | | | |
|---|---|---|---|---|
| Young's modulus (Relative value) | 82 | 86 | 89 | 96 |

| Examples | Comp. Ex. 9 | Comp. Ex. 10 | Comp. Ex. 11 | Comp. Ex. 12 |
|---|---|---|---|---|
| Production of non-magnetic coating | | | | |
| Kind of titanium oxide particles | Titanium oxide particles (E) | Titanium oxide particles (F) | Titanium oxide particles (G) | Titanium oxide particles (H) |
| Weight ratio of particles and resin | 5.0 | 5.0 | 5.0 | 5.0 |
| Non-magnetic coating Viscosity (cP) | 1,152 | 768 | 2,304 | 461 |
| Non-magnetic undercoat layer | | | | |
| Thickness (μm) | 2.8 | 2.8 | 2.9 | 3.0 |
| Gloss (%) | 68 | 120 | 73 | 43 |
| Surface roughness (nm) | 112 | 18.6 | 96.0 | 176 |
| Young's modulus (Relative value) | 84 | 98 | 78 | 103 |

TABLE 5-continued

| Examples | Comp. Ex. 13 | Comp. Ex. 14 | Comp. Ex. 15 | Comp. Ex. 16 |
|---|---|---|---|---|
| Production of non-magnetic coating | | | | |
| Kind of titanium oxide particles | Comp. Ex. 1 | Comp. Ex. 2 | Comp. Ex. 3 | Comp. Ex. 4 |
| Weight ratio of particles and resin | 5.0 | 5.0 | 5.0 | 5.0 |
| Non-magnetic coating Viscosity (cP) | 794 | 768 | 1,126 | 742 |
| Non-magnetic undercoat layer | | | | |
| Thickness (μm) | 3.2 | 3.0 | 3.0 | 3.1 |
| Gloss (%) | 98 | 108 | 96 | 110 |
| Surface roughness (nm) | 38.6 | 19.8 | 39.0 | 18.8 |
| Young's modulus (Relative value) | 91 | 96 | 98 | 95 |

TABLE 6

| Kind of magnetic particles | Magnetic iron-based metal particles (a) | Magnetic iron-based metal particles (b) | Magnetic iron-based metal particles (c) | Magnetic-iron-based metal particles (d) |
|---|---|---|---|---|
| Properties of magnetic iron-based metal particles | | | | |
| Average major axial diameter (μm) | 0.121 | 0.162 | 0.104 | 0.110 |
| Average minor axial diameter (μm) | 0.0191 | 0.0221 | 0.0158 | 0.0150 |
| Geometric standard deviation (σg) | 1.41 | 1.37 | 1.35 | 1.36 |
| Aspect ratio | 6.3 | 7.3 | 6.6 | 7.3 |
| Coercive force (Oe) | 1,840 | 1,630 | 1,905 | 1,915 |
| Saturation magnetization (emu/g) | 130.0 | 137.1 | 138.0 | 131.6 |
| Co content (wt %) | 5.61 | 2.30 | 6.31 | 5.93 |
| Abundance of Al | | | | |
| •Central portion (wt %) | 1.71 | 2.17 | 1.12 | 2.61 |
| •Surface layer portion (wt %) | 0.03 | 0.01 | 2.55 | 1.36 |
| •Surface coat (wt %) | 0.01 | 0.01 | 0.48 | 0.01 |
| Nd content (wt %) | 0.00 | 0.00 | 0.36 | 0.01 |

TABLE 6-continued

| Resin adsorption strength (%) | 73.6 | 75.6 | 80.1 | 72.5 |
|---|---|---|---|---|

| Kind of magnetic particles | Magnetic iron-based metal particles (e) | Magnetic iron-based metal particles (f) | Magnetic iron-based metal particles (g) |
|---|---|---|---|
| Properties of magnetic iron-based metal particles | | | |
| Average major axial diameter ($\mu$m) | 0.098 | 0.101 | 0.125 |
| Average minor axial diameter ($\mu$m) | 0.0134 | 0.0144 | 0.0184 |
| Geometric standard deviation ($\sigma$g) | 1.35 | 1.38 | 1.35 |
| Aspect ratio | 7.3 | 7.0 | 6.8 |
| Coercive force (Oe) | 1,938 | 2,065 | 1,896 |
| Saturation magnetization (emu/g) | 130.5 | 128.9 | 130.8 |
| Co content (wt %) | 5.80 | 6.51 | 5.21 |
| Abundance of Al | | | |
| •Central portion (wt %) | 1.32 | 1.38 | 0.01 |
| •Surface layer portion (wt %) | 2.84 | 2.65 | 0.01 |
| •Surface coat (wt %) | 0.01 | 0.78 | 0.01 |
| Nd content (wt %) | 0.36 | 2.78 | 0.01 |
| Resin adsorption strength (%) | 80.1 | 83.6 | 57.6 |

TABLE 7

| Examples | Ex. 3 | Ex. 34 | Ex. 35 | Ex. 36 |
|---|---|---|---|---|
| Magnetic recording medium | | | | |
| Kind of magnetic undercoat layer | Ex. 2 | Ex. 19 | Ex. 21 | Ex. 23 |
| Kind of magnetic particles | Magnetic iron-based metal particles (a) | Magnetic iron-based metal particles (a) | Magnetic iron-based metal particles (a) | Magnetic iron-based metal particles (a) |
| Weight ratio of magnetic particles and resin | 5.0 | 5.0 | 5.0 | 5.0 |
| Thickness of magnetic layer ($\mu$m) | 1.1 | 1.2 | 1.1 | 1.2 |
| Coercive force (Oe) | 1,890 | 1,916 | 1,891 | 1,950 |
| Br/Bm | 0.86 | 0.87 | 0.86 | 0.87 |
| Gloss (%) | 215 | 205 | 196 | 200 |
| Surface roughness (nm) | 9.6 | 9.8 | 11.2 | 10.6 |
| Young's modulus (Relative value) | 119 | 117 | 121 | 126 |
| Durability | | | | |
| •Running durability (min) | 22.8 | 22.4 | 21.6 | 22.0 |
| •Scratch resistance | A | A | B | B |
| Linear absorption coefficient ($\mu$m$^{-1}$) | 1.22 | 1.20 | 1.24 | 1.23 |
| Corrosiveness | | | | |
| •Rate of change in coercive force (%) | 7.0 | 7.8 | 6.3 | 8.8 |
| •Rate of change in Bm (%) | 8.5 | 6.5 | 7.8 | 9.5 |

| Examples | Ex. 37 | Ex. 38 | Ex. 39 | Ex. 40 |
|---|---|---|---|---|
| Magnetic recording medium | | | | |
| Kind of non-magnetic undercoat layer | Ex. 25 | Ex. 28 | Ex. 30 | Ex. 32 |
| Kind of magnetic particles | Magnetic iron-based metal particles (a) | Magnetic iron-based metal particles (a) | Magnetic iron-based metal particles (a) | Magnetic iron-based metal particles (a) |
| Weight ratio of magnetic particles and resin | 5.0 | 5.0 | 5.0 | 5.0 |
| Thickness of magnetic layer ($\mu$m) | 1.1 | 1.1 | 1.0 | 0.9 |
| Coercive force (Oe) | 1,883 | 1,903 | 1,915 | 1,919 |
| Br/Bm | 0.85 | 0.87 | 0.88 | 0.88 |
| Gloss (%) | 186 | 201 | 213 | 220 |

TABLE 7-continued

| | | | | |
|---|---|---|---|---|
| Surface roughness (nm) | 12.2 | 10.0 | 9.2 | 8.6 |
| Young's modulus (Relative value) | 114 | 121 | 116 | 132 |
| Durability | | | | |
| •Running durability (min) | 21.0 | 24.9 | 26.1 | 30≦ |
| •Scratch resistance | B | A | A | A |
| Linear absorption coefficient ($\mu m^{-1}$) | 1.20 | 1.21 | 1.20 | 1.26 |
| Corrosiveness | | | | |
| •Rate of change in coercive force (%) | 6.6 | 4.6 | 3.2 | 4.0 |
| •Rate of change in Bm (%) | 5.2 | 3.6 | 3.0 | 5.1 |

| Examples | Ex. 41 | Ex. 42 | Ex. 43 | Ex. 44 |
|---|---|---|---|---|
| Magnetic recording medium | | | | |
| Kind of non-magnetic undercoat layer | Ex. 26 | Ex. 20 | Ex. 22 | Ex. 24 |
| Kind of magnetic particles | Magnetic iron-based metal particles (a) | Magnetic iron-based metal particles (b) | Magnetic iron-based metal particles (b) | Magnetic iron-based metal particles (b) |
| Weight ratio of magnetic particles and resin | 5.0 | 5.0 | 5.0 | 5.0 |
| Thickness of magnetic layer | 1.1 | 1.0 | 1.1 | 1.0 |
| Coercive force (Oe) | 1,923 | 1,680 | 1,691 | 1,695 |
| Br/Bm | 0.88 | 0.88 | 0.88 | 0.88 |
| Gloss (%) | 229 | 210 | 213 | 218 |
| Surface roughness (nm) | 7.9 | 10.6 | 9.4 | 8.8 |
| Young's modulus (Relative value) | 120 | 120 | 121 | 136 |
| Durability | | | | |
| •Running durability (min) | 25.1 | 20.7 | 26.5 | 29.6 |
| •Scratch resistance | A | B | A | A |
| Linear absorption coefficient ($\mu m^{-1}$) | 1.21 | 1.22 | 1.23 | 1.24 |
| Corrosiveness | | | | |
| •Rate of change in coercive force (%) | 6.2 | 5.6 | 8.6 | 8.3 |
| •Rate of change in Bm (%) | 7.8 | 6.1 | 8.8 | 9.0 |

| Examples | Ex. 45 | Ex. 46 | Ex. 47 | Ex. 48 |
|---|---|---|---|---|
| Magnetic recording medium | | | | |
| Kind of non-magnetic undercoat layer | Ex. 27 | Ex. 29 | Ex. 31 | Ex. 33 |
| Kind of magnetic particles | Magnetic iron-based metal particles (b) | Magnetic iron-based metal particles (b) | Magnetic iron-based metal particles (b) | Magnetic iron-based metal particles (b) |
| Weight ratio of magnetic particles and resin | 5.0 | 5.0 | 5.0 | 5.0 |
| Thickness of magnetic layer | 1.1 | 1.1 | 1.1 | 1.1 |
| Coercive force (Oe) | 1,712 | 1,701 | 1,676 | 1,668 |
| Br/Bm | 0.90 | 0.89 | 0.87 | 0.87 |
| Gloss (%) | 225 | 214 | 201 | 194 |
| Surface roughness (nm) | 8.0 | 8.8 | 10.2 | 11.6 |
| Young's modulus (Relative value) | 120 | 123 | 116 | 136 |
| Durability | | | | |
| •Running durability (min) | 30≦ | 27.5 | 20.8 | 29.0 |
| •Scratch resistance | A | A | A | A |
| Linear absorption coefficient ($\mu m^{-1}$) | 1.22 | 1.23 | 1.24 | 1.25 |
| Corrosiveness | | | | |
| •Rate of change in coercive force (%) | 4.1 | 6.6 | 4.8 | 3.6 |
| •Rate of change in Bm (%) | 6.8 | 7.8 | 6.5 | 4.6 |

TABLE 8

| Examples | Ex. 49 | Ex. 50 | Ex. 51 | Ex. 52 |
|---|---|---|---|---|
| Magnetic recording medium | | | | |
| Kind of non-magnetic undercoat layer | Ex. 2 | Ex. 19 | Ex. 20 | Ex. 21 |
| Kind of magnetic particles | Magnetic iron-based metal particles (c) | Magnetic iron-based metal particles (d) | Magnetic iron-based metal particles (d) | Magnetic iron-based metal particles (d) |
| Weight ratio of magnetic particles and resin | 5.0 | 5.0 | 5.0 | 5.0 |
| Thickness of magnetic layer ($\mu m$) | 1.1 | 1.0 | 1.0 | 1.1 |
| Coercive force (Oe) | 1,969 | 1,990 | 1,995 | 1,982 |
| Br/Bm | 0.87 | 0.87 | 0.88 | 0.88 |
| Gloss (%) | 231 | 237 | 237 | 228 |
| Surface roughness (nm) | 7.0 | 6.9 | 7.2 | 7.2 |
| Young's modulus (Relative value) | 132 | 128 | 127 | 130 |
| Durability | | | | |
| •Running durability (min) | 30≦ | 26.8 | 27.1 | 26.0 |
| •Scratch resistance | A | A | A | B |
| Linear absorption coefficient ($\mu m^{-1}$) | 1.21 | 1.21 | 1.22 | 1.23 |
| Corrosiveness | | | | |
| •Rate of change in coercive force (%) | 4.8 | 6.7 | 4.7 | 7.6 |
| •Rate of change in Bm (%) | 5.3 | 5.4 | 5.1 | 6.0 |

TABLE 8-continued

| Examples | Ex. 53 | Ex. 54 | Ex. 55 | Ex. 56 |
|---|---|---|---|---|
| Magnetic recording medium | | | | |
| Kind of non-magnetic undercoat layer | Ex. 22 | Ex. 23 | Ex. 24 | Ex. 25 |
| Kind of magnetic particles | Magnetic iron-based metal particles (d) | Magnetic iron-based metal particles (c) | Magnetic iron-based metal particles (c) | Magnetic iron-based metal particles (e) |
| Weight ratio of magnetic particles and resin | 5.0 | 5.0 | 5.0 | 5.0 |
| Thickness of magnetic layer ($\mu m$) | 1.0 | 1.0 | 1.1 | 1.1 |
| Coercive force (Oe) | 1,987 | 1,977 | 1,974 | 1,999 |
| Br/Bm | 0.87 | 0.88 | 0.87 | 0.89 |
| Gloss (%) | 230 | 231 | 229 | 221 |
| Surface roughness (nm) | 7.9 | 7.6 | 7.0 | 7.5 |
| Young's modulus (Relative value) | 131 | 127 | 126 | 130 |
| Durability | | | | |
| •Running durability (min) | 25.2 | 30≦ | 30≦ | 30≦ |
| •Scratch resistance | B | A | A | A |
| Linear absorption coefficient ($\mu m^{-1}$) | 1.24 | 1.21 | 1.22 | 1.23 |
| Corrosiveness | | | | |
| •Rate of change in coercive force (%) | 5.7 | 4.8 | 6.0 | 6.8 |
| •Rate of change in Bm (%) | 5.3 | 6.3 | 7.5 | 6.0 |

| Examples | Ex. 57 | Ex. 58 | Ex. 59 | Ex. 60 |
|---|---|---|---|---|
| Magnetic recording medium | | | | |
| Kind of non-magnetic undercoat layer | Ex. 26 | Ex. 27 | Ex. 28 | Ex. 29 |
| Kind of magnetic particles | Magnetic iron-based metal particles (e) | Magnetic iron-based metal particles (d) | Magnetic iron-based metal particles (e) | Magnetic iron-based metal particles (e) |
| Weight ratio of magnetic particles and resin | 5.0 | 5.0 | 5.0 | 5.0 |
| Thickness of magnetic layer ($\mu m$) | 1.0 | 1.1 | 1.1 | 1.1 |
| Coercive force (Oe) | 1,989 | 1,975 | 1,998 | 1,989 |
| Br/Bm | 0.88 | 0.87 | 0.88 | 0.89 |
| Gloss (%) | 224 | 232 | 236 | 241 |
| Surface roughness (nm) | 7.8 | 6.8 | 6.3 | 6.6 |
| Young's modulus (Relative value) | 132 | 128 | 127 | 129 |
| Durability | | | | |
| •Running durability (min) | 30≦ | 26.8 | 30≦ | 30≦ |
| •Scratch resistance | A | B | A | A |
| Linear absorption coefficient ($\mu m^{-1}$) | 1.25 | 1.21 | 1.25 | 1.26 |
| Corrosiveness | | | | |
| •Rate of change in coercive force (%) | 7.2 | 3.1 | 1.8 | 3.6 |
| •Rate of change in Bm (%) | 9.0 | 5.4 | 6.4 | 4.1 |

| Examples | Ex. 61 | Ex. 62 | Ex. 63 | Ex. 64 |
|---|---|---|---|---|
| Magnetic recording medium | | | | |
| Kind of non-magnetic undercoat layer | Ex. 30 | Ex. 31 | Ex. 32 | Ex. 33 |
| Kind of magnetic particles | Magnetic iron-based metal particles (f) | Magnetic iron-based metal particles (f) | Magnetic iron-based metal particles (f) | Magnetic iron-based metal particles (f) |
| Weight ratio of magnetic particles and resin | 5.0 | 5.0 | 5.0 | 5.0 |
| Thickness of magnetic layer ($\mu m$) | 1.2 | 1.1 | 1.0 | 1.0 |
| Coercive force (Oe) | 2,138 | 2,145 | 2,143 | 2,134 |
| Br/Bm | 0.90 | 0.89 | 0.90 | 0.89 |
| Gloss (%) | 238 | 238 | 241 | 243 |
| Surface roughness (nm) | 6.1 | 6.0 | 5.8 | 5.9 |
| Young's modulus (Relative value) | 129 | 131 | 127 | 128 |
| Durability | | | | |
| •Running durability (min) | 30≦ | 30≦ | 30≦ | 30≦ |
| •Scratch resistance | A | A | A | A |
| Linear absorption coefficient | 1.26 | 1.25 | 1.25 | 1.26 |
| Corrosiveness | | | | |
| •Rate of change in coercive force (%) | 6.7 | 7.0 | 8.3 | 6.4 |
| •Rate of change in Bm (%) | 3.5 | 7.8 | 3.6 | 5.1 |

| Examples | Ex. 65 | Ex. 66 | Ex. 67 | Ex. 68 |
|---|---|---|---|---|
| Magnetic recording medium | | | | |
| Kind of non-magnetic undercoat layer | Ex. 2 | Ex. 2 | Ex. 2 | Ex. 2 |
| Kind of magnetic particles | Magnetic iron-based metal particles (g) | Magnetic iron-based metal particles (g) | Magnetic iron-based metal particles (g) | Magnetic iron-based metal particles (g) |
| Weight ratio of magnetic particles and resin | 5.0 | 5.0 | 5.0 | 5.0 |
| Thickness of magnetic layer ($\mu m$) | 1.1 | 1.1 | 1.1 | 1.1 |
| Coercive force (Oe) | 1,895 | 1,899 | 1,896 | 1,895 |

TABLE 8-continued

| | | | | |
|---|---|---|---|---|
| Br/Bm | 0.86 | 0.86 | 0.85 | 0.85 |
| Gloss (%) | 206 | 204 | 203 | 196 |
| Surface roughness (nm) | 9.6 | 8.4 | 8.6 | 9.9 |
| Young's modulus (Relative value) | 123 | 121 | 120 | 121 |
| Durability | | | | |
| •Running durability (min) | 20.6 | 21.8 | 22.7 | 23.1 |
| •Scratch resistance | B | B | B | B |
| Linear absorption coefficient ($\mu m^{-1}$) | 1.21 | 1.22 | 1.21 | 1.21 |
| Corrosiveness | | | | |
| •Rate of change in coercive force (%) | 5.8 | 2.6 | 6.4 | 7.4 |
| •Rate of change in Bm (%) | 6.3 | 4.1 | 4.5 | 5.7 |

| Examples | Ex. 69 |
|---|---|
| Magnetic recording medium | |
| Kind of non-magnetic undercoat layer | Ex. 2 |
| Kind of magnetic particles | Magnetic iron-based metal particles (g) |
| Weight ratio of magnetic particles and resin | 5.0 |
| Thickness of magnetic layer | 1.0 |
| Coercive force (Oe) | 1,906 |
| Br/Bm | 0.86 |
| Gloss (%) | 199 |
| Surface roughness (nm) | 9.0 |
| Young's modulus (Relative value) | 120 |
| Durability | |
| •Running durability (min) | 22.9 |
| •Scratch resistance | B |
| Linear absorption coefficient ($\mu m^{-1}$) | 1.21 |
| Corrosiveness | |
| •Rate of change in coercive force (%) | 5.5 |
| •Rate of change in Bm (%) | 6.0 |

TABLE 9

| Examples | Comp. Ex. 17 | Comp. Ex. 18 | Comp. Ex. 19 | Comp. Ex. 20 |
|---|---|---|---|---|
| Magnetic recording medium | | | | |
| Kind of non-magnetic undercoat layer | Comp. Ex. 5 | Comp. Ex. 7 | Comp. Ex. 9 | Comp. Ex. 11 |
| Kind of magnetic particles | Magnetic iron-based metal particles (a) | Magnetic iron-based metal particles (a) | Magnetic iron-based metal particles (a) | Magnetic iron-based metal particles (a) |
| Weight ratio of magnetic particles and resin | 5.0 | 5.0 | 5.0 | 5.0 |
| Thickness of magnetic layer ($\mu m$) | 1.1 | 1.1 | 1.2 | 1.1 |
| Coercive force (Oe) | 1,866 | 1,856 | 1,822 | 1,816 |
| Br/Bm | 0.84 | 0.84 | 0.78 | 0.78 |
| Gloss (%) | 176 | 168 | 106 | 122 |
| Surface roughness (nm) | 16.2 | 18.6 | 46.6 | 32.2 |
| Young's modulus (Relative value) | 106 | 98 | 81 | 86 |
| Durability | | | | |
| •Running durability (min) | 14.8 | 13.6 | 10.2 | 11.8 |
| •Scratch resistance | C | C | D | D |
| Linear absorption coefficient ($\mu m^{-1}$) | 1.13 | 1.06 | 1.05 | 1.05 |
| Corrosiveness | | | | |
| •Rate of change in coercive force (%) | 16.8 | 16.8 | 36.3 | 40.6 |
| •Rate of change in Bm (%) | 17.6 | 15.6 | 25.8 | 39.2 |

TABLE 9-continued

| Examples | Comp. Ex. 21 | Comp. Ex. 22 | Comp. Ex. 23 | Comp. Ex. 24 |
|---|---|---|---|---|
| Magnetic recording medium | | | | |
| Kind of non-magnetic undercoat layer | Comp. Ex. 13 | Comp. Ex. 15 | Comp. Ex. 6 | Comp. Ex. 8 |
| Kind of magnetic particles | Magnetic iron-based metal particles (a) | Magnetic iron-based metal particles (a) | Magnetic iron-based metal particles (b) | Magnetic iron-based metal particles (b) |
| Weight ratio of magnetic particles and resin | 5.0 | 5.0 | 5.0 | 5.0 |
| Thickness of magnetic layer ($\mu m$) | 1.1 | 1.2 | 1.1 | 1.4 |
| Coercive force (Oe) | 1,840 | 1,862 | 1,672 | 1,646 |
| Br/Bm | 0.80 | 0.82 | 0.83 | 0.81 |
| Gloss (%) | 162 | 169 | 170 | 135 |
| Surface roughness (nm) | 21.6 | 17.6 | 15.8 | 28.9 |
| Young's modulus (Relative value) | 93 | 108 | 109 | 88 |
| Durability | | | | |
| •Running durability (min) | 10.0 | 13.4 | 14.9 | 12.1 |
| •Scratch resistance | D | C | C | D |
| Linear absorption coefficient ($\mu m^{-1}$) | 1.08 | 1.14 | 1.14 | 1.01 |
| Corrosiveness | | | | |
| •Rate of change | 12.8 | 11.8 | 21.2 | 19.8 |

TABLE 9-continued

| | Comp. Ex. 25 | Comp. Ex. 26 | Comp. Ex. 27 | Comp. Ex. 28 |
|---|---|---|---|---|
| Magnetic recording medium | | | | |
| Kind of non-magnetic undercoat layer | Comp. Ex. 10 | Comp. Ex. 12 | Comp. Ex. 14 | Comp. Ex. 16 |
| Kind of magnetic particles | Magnetic iron-based metal particles (b) | Magnetic iron-based metal particles (b) | Magnetic iron-based metal particles (b) | Magnetic iron-based metal particles (b) |
| Weight ratio of magnetic particles and resin | 5.0 | 5.0 | 5.0 | 5.0 |
| Thickness of magnetic layer ($\mu$m) | 1.0 | 1.2 | 1.1 | 1.2 |
| Coercive force (Oe) | 1,660 | 1,612 | 1,648 | 1,668 |
| Br/Bm | 0.83 | 0.77 | 0.82 | 0.82 |
| Gloss (%) | 158 | 110 | 161 | 165 |
| Surface roughness (nm) | 22.6 | 56.6 | 19.8 | 17.5 |
| Young's modulus (Relative value) | 98 | 78 | 106 | 108 |
| Durability | | | | |
| •Running durability (min) | 11.0 | 10.2 | 13.9 | 13.2 |
| •Scratch resistance | D | D | D | C |
| Linear absorption coefficient ($\mu$m$^{-1}$) | 1.09 | 1.04 | 1.08 | 1.11 |
| Corrosiveness | | | | |
| •Rate of change in coercive force (%) | 15.6 | 51.2 | 13.6 | 10.6 |
| •Rate of change in Bm (%) | 16.5 | 50.6 | 12.8 | 12.9 |

| | Comp. Ex. 29 | Comp. Ex. 30 |
|---|---|---|
| Magnetic recording medium | | |
| Kind of non-magnetic undercoat layer | Comp. Ex. 5 | Comp. Ex. 6 |
| Kind of magnetic particles | Magnetic iron-based metal particles (g) | Magnetic iron-based metal particles (g) |
| Weight ratio of magnetic particles and resin | 5.0 | 5.0 |
| Thickness of magnetic layer ($\mu$m) | 1.2 | 1.2 |
| Coercive force (Oe) | 1,883 | 1,878 |
| Br/Bm | 0.80 | 0.82 |
| Gloss (%) | 168 | 170 |
| Surface roughness (nm) | 21.6 | 18.7 |
| Young's modulus (Relative value) | 104 | 103 |
| Durability | | |
| •Running durability (min) | 1.6 | 3.6 |
| •Scratch resistance | D | D |
| Linear absorption coefficient ($\mu$m$^{-1}$) | 1.13 | 1.14 |
| Corrosiveness | | |
| •Rate of change in coercive force (%) | 34.1 | 26.7 |
| •Rate of change in Bm (%) | 27.9 | 21.9 |

What is claimed is:

1. Titanium oxide particles having an average particle size of not more than 0.3 $\mu$m and a BET specific surface are of 15 to 200 m$^2$/g, containing a soluble sodium salt of not more than 230 ppm, calculated as Na, and a soluble sulfate of not more than 150 ppm, calculated as SO$_4$, and having a pH value of not less than 8, the surfaces of said titanium oxide particles being coated with at least one member selected from the group consisting of a hydroxide of aluminum, an oxide of aluminum, a hydroxide of silicon and an oxide of silicon.

2. Titanium oxide particles according to claim 1, wherein the amount of coated material is 0.01 to 50 wt %, calculated as Al, based on the weight of the particles, 0.01 to 50 wt %, calculated s SiO$_2$, based on the weight of the particles, or 0.01 to 50 wt %, calculated as Al and SiO$_2$, based on the weight of the particles.

3. Titanium oxide particles according to claim 1, wherein when the shape of said particles is granular and the average particle diameter is 0.005 to 0.3 $\mu$m.

4. Titanium oxide particles according to claim 1, wherein when the shape of the said particles is either of acicular or rice-ball shaped, the average major axial diameter is 0.005 to 0.3 $\mu$m, the average minor axial diameter is 0.0025 to 0.15 $\mu$m and the aspect ratio is 2:1 to 20:1.

5. Titanium oxide particles according to claim 1, wherein the particle size distribution based on the particle diameter in a geometrical standard deviation is not more than 1.5.

6. Titanium oxide particles according to claim 1, which further have 0.5 to 3.0 of a degree of denseness represented by the ratio ($S_{BET}/S_{TEM}$) of the specific surface area ($S_{BET}$) measured by a BET method and surface are ($S_{TEM}$) calculated from the average particle diameter measured from the particles in an electron microphotograph.

7. Titanium oxide particles according to claim 1, wherein said content of soluble chloride is not more than 100 ppm, calculated as Cl.

8. A substrate for a magnetic recording medium comprising:

a non-magnetic base film; and a non-magnetic undercoat layer formed on said non-magnetic base film and comprising titanium oxide particles as defined in claim 1 as non-magnetic particles and a binder resin.

9. A substrate according to claim 8, wherein said non-magnetic undercoat layer has a thickness of 0.2 to 10.0 $\mu$m.

10. A substrate according to claim 8, wherein the amount of said titanium oxide particles are 5 to 2000 pats by weight based on 100 parts by weight of said binder resin.

11. A substrate according to claim 8, which further have a gloss of 140 to 280% and the surface roughness Ra of 1.0 to 15.0 nm.

12. A magnetic recording medium comprising:

the substrate as defined in claim 8; and a magnetic recording layer comprising magnetic particles containing iron as a main ingredient and a binder resin which is formed on siad non-magnetic undercoat layer.

13. A magnetic recording medium according to claim 12, wherein said magnetic recording layer has a thickness of 0.01 to 3.0 μm.

14. A magnetic recording medium according to claim 12, wherein said magnetic particles containing iron as a main ingredient have an average major axial diameter of 0.01 to 0.3 μm, an aspect ratio of 3:1 to 15:1, a coercive force of 1200 to 3200 Oe, and a saturation magnetization of 100 to 170 emu/g.

15. A magnetic recording medium according to claim 12, wherein said magnetic particles containing iron as a main ingredient comprises iron and at least one member selected from the group consisting of Co, Al, Ni, P, Si, Zn, Cu, B, Nd, La and Y.

16. A magnetic recording medium according to claim 12, wherein the amount of said magnetic particles containing iron as a main ingredient is 200 to 2000 parts by weight based on 100 parts by weight of said binder resin.

17. A magnetic recording medium according to claim 12, which further has a coercive force of 900 to 3500 Oe, a squareness of 0.85 to 0.95, a gloss of 180 to 300%, a surface roughness of not more than 15.0 nm, the linear absorption coefficient of 1.15 to 2.00 μm, the corrosiveness represented by a rate of change in the coercive force after 14 days of not more than 10.0%, and the corrosiveness represented by a rate of change in the saturation magnetic flux density after 14 days of not more than 10.0%.

* * * * *